US011774705B1

(12) United States Patent
Ebert et al.

(10) Patent No.: US 11,774,705 B1
(45) Date of Patent: Oct. 3, 2023

(54) SYSTEMS AND METHODS FOR VARIFOCAL ADJUSTMENT BRAKES

(71) Applicant: META PLATFORMS TECHNOLOGIES, LLC, Menlo Park, CA (US)

(72) Inventors: Ryan Michael Ebert, Issaquah, WA (US); Clinton Smith, Redmond, WA (US); David C. Lindberg, Portland, OR (US); Nathaniel David Ginzton, Boise, ID (US); Seth Robert Moczydlowski, Austin, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 111 days.

(21) Appl. No.: 16/870,510

(22) Filed: May 8, 2020

Related U.S. Application Data

(60) Provisional application No. 62/905,432, filed on Sep. 25, 2019.

(51) Int. Cl.
*G02B 27/01* (2006.01)
*G02B 7/10* (2021.01)

(52) U.S. Cl.
CPC ........... *G02B 7/10* (2013.01); *G02B 27/0172* (2013.01); *G02B 27/0176* (2013.01)

(58) Field of Classification Search
CPC .... G02B 7/10; G02B 27/017; G02B 27/0172; G02B 27/0176; G02B 27/01; G02B 27/0101; G02B 27/0103; G02B 27/104; G02B 27/141; G02B 26/101; G02B 30/27; G02B 30/50; G02B 2027/0105; G02B 2027/0114; G02B 2027/0134; G02B 2027/014; G02B 2027/0196; B60K 37/02; B60K 2370/1531; H04N 13/189; H04N 13/32; H04N 13/322; H04N 13/363
See application file for complete search history.

(56) References Cited

U.S. PATENT DOCUMENTS

| 5,546,238 A * | 8/1996 | Devenyi | G02B 7/10 |
| | | | 359/813 |
| 10,613,323 B1 * | 4/2020 | Wheelwright | G02B 27/0093 |
| 2008/0106813 A1 * | 5/2008 | Lee | G02B 7/102 |
| | | | 359/824 |
| 2010/0232161 A1 * | 9/2010 | Aschwanden | G02B 3/14 |
| | | | 359/666 |
| 2018/0275367 A1 * | 9/2018 | Lim | H04N 5/23212 |
| 2019/0212546 A1 | 7/2019 | Sohn et al. | |
| 2019/0369383 A1 * | 12/2019 | Nguyen | G02B 3/14 |

FOREIGN PATENT DOCUMENTS

CN 112236713 A * 1/2021 ........... G02B 26/004

* cited by examiner

*Primary Examiner* — Nitin Patel
*Assistant Examiner* — Cory A Almeida
(74) *Attorney, Agent, or Firm* — Greenberg Traurig, LLP

(57) ABSTRACT

The disclosed system for varifocal adjustments may include a frame, an optical lens pair supported by the frame, and a brake mechanism coupled to the frame. The optical lens pair may include a first lens that is movably coupled to the frame and a second lens that is fixedly coupled to the frame. The brake mechanism may be configured to frictionally stop movement of the first lens and to maintain a position of the first lens. Various other devices, systems, and methods are also disclosed.

20 Claims, 32 Drawing Sheets

2800

Move a first optical lens positioned between a second optical lens and an electronic display that are stationary relative to a frame
2810

Guide the movement of the first optical lens with a flexure assembly having a first movable end portion coupled to the first optical lens and a second fixed end portion coupled to the frame
2820

*FIG. 28*

2900

```
┌─────────────────────────────────────────────────────────────┐
│ Fixedly coupling an electronic display and a stationary     │
│ optical lens to a frame                                     │
│ 2910                                                        │
└─────────────────────────────────────────────────────────────┘
                            │
                            ▼
┌─────────────────────────────────────────────────────────────┐
│ Positioning a movable optical lens between the electronic   │
│ display and the stationary optical lens                     │
│ 2920                                                        │
└─────────────────────────────────────────────────────────────┘
                            │
                            ▼
┌─────────────────────────────────────────────────────────────┐
│ Coupling a first movable end portion of a flexure assembly  │
│ to the movable optical lens and coupling a second fixed end │
│ portion of the flexure assembly to the frame                │
│ 2930                                                        │
└─────────────────────────────────────────────────────────────┘
```

Move a first lens relative to a frame supporting the first lens and relative to a second lens fixedly coupled to the frame, wherein the lens is moved from a first position to a second position
3010

Maintain the first lens in the second position by applying, with a brake mechanism, a braking pressure against a mounting bracket coupled to the first lens
3020

FIG. 30

SYSTEMS AND METHODS FOR VARIFOCAL ADJUSTMENT BRAKES

CROSS-REFERENCE TO RELATED APPLICATIONS

This application claims the benefit of U.S. Provisional Patent Application Ser. No. 62/905,432, titled "SYSTEMS AND METHODS FOR VARIFOCAL ADJUSTMENTS," filed 25 Sep. 2019, the entire disclosure of which is incorporated herein by reference.

BRIEF DESCRIPTION OF THE DRAWINGS

The accompanying figures illustrate a number of example embodiments and are a part of the specification. Together with the following description, these figures demonstrate and explain various principles of the present disclosure.

FIG. 28 is a flow diagram illustrating a method of varying at least one optical property of an optical lens system, according to at least one embodiment of the present disclosure.

FIG. 29 is a flow diagram illustrating a method of fabricating a display subassembly, according to at least one embodiment of the present disclosure.

FIG. 30 is a flow diagram illustrating a method of making varifocal adjustments, according to at least one embodiment of the present disclosure.

Figure 1:
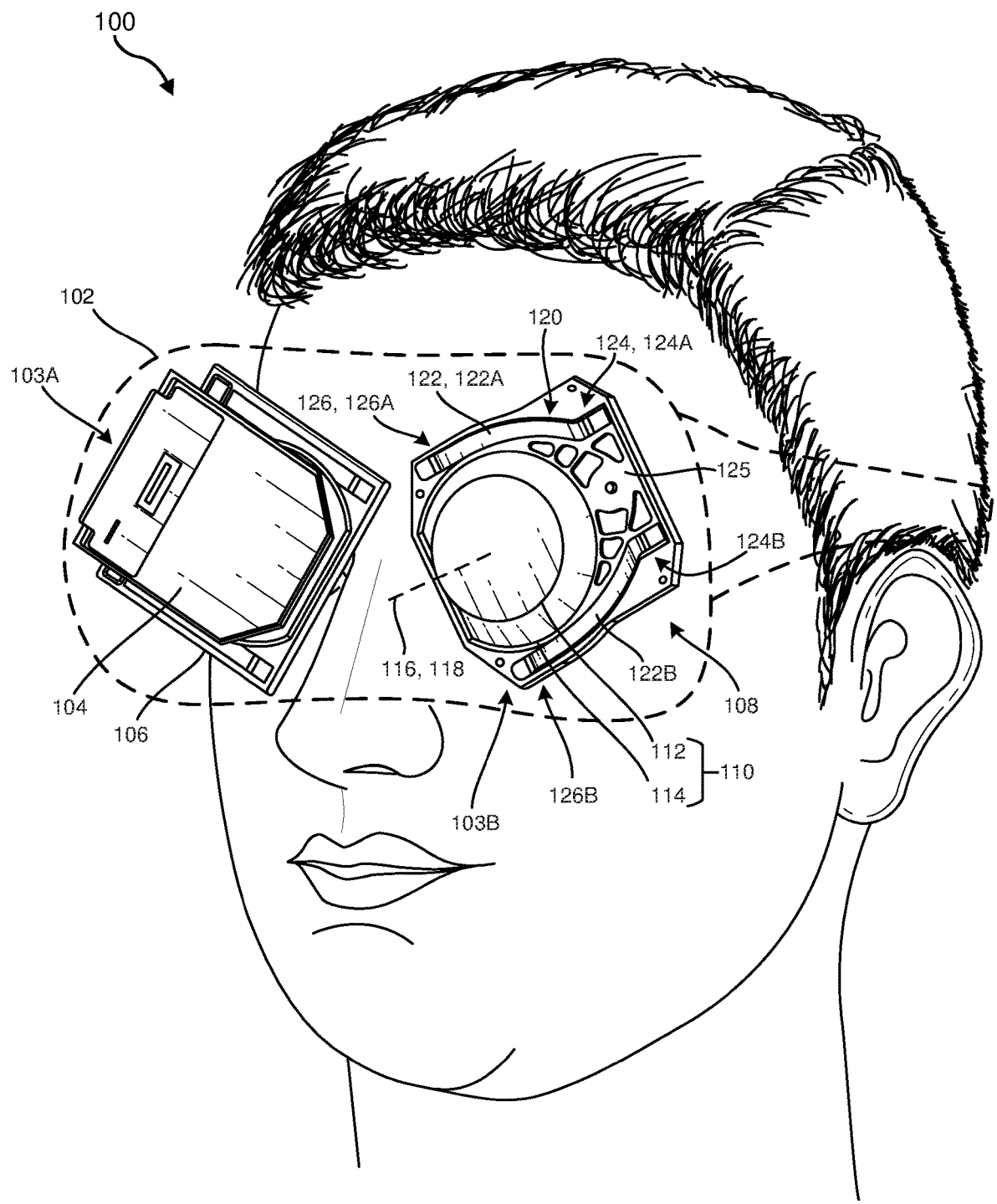
FIG. 1 is an illustration of a user wearing a head-mounted display ("HMD") system, with certain portions and elements of the HMD system removed or shown as transparent to view underlying and internal elements, according to at least one embodiment of the present disclosure.

Throughout the figures, identical reference characters and descriptions indicate similar, but not necessarily identical, elements. While the example embodiments described herein are susceptible to various modifications and alternative forms, specific embodiments have been shown by way of example in the appendices and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Varifocal systems may be useful in a variety of devices, including eyeglasses, cameras, and artificial-reality (e.g., virtual-reality, augmented-reality, hybrid-reality, or mixed-reality) systems. For example, in artificial-reality systems, a head-mounted display ("HMD") may present stereoscopic digital images to a user's eyes to provide the impression of three-dimensional ("3D") objects and scenes. The images may be projected through one or more lenses. Varifocal systems may enable a focal distance of the images to be adjusted, such as to counteract or supplement natural focal changes in the user's eyes as the user observes the images at different perceived 3D distances.

The present disclosure is generally directed to systems and methods for varifocal adjustments. In some embodiments, the present disclosure includes systems and methods for moving a first lens of a lens pair to adjust a distance between the first lens and a second lens of the lens pair, which may alter at least one optical property (e.g., a focal distance) of the lens pair. The first lens may be moved substantially along an optical axis of the first lens. For example, the first lens may be coupled to a flexure assembly and/or a ball-bearing assembly, which may act as a guide for movement of the first lens between two or more positions. In some examples, the flexure assembly and/or ball-bearing assembly may constrain movement of the first lens to a substantially linear pathway. In some embodiments, the movement of the first lens may include some off-axis tilting, which may be predictable due to the configuration of the flexure assembly and/or ball-bearing assembly. This predictability may enable compensation of displayed images to be achieved, such as through software-driven alterations of the displayed images.

Figure 10:
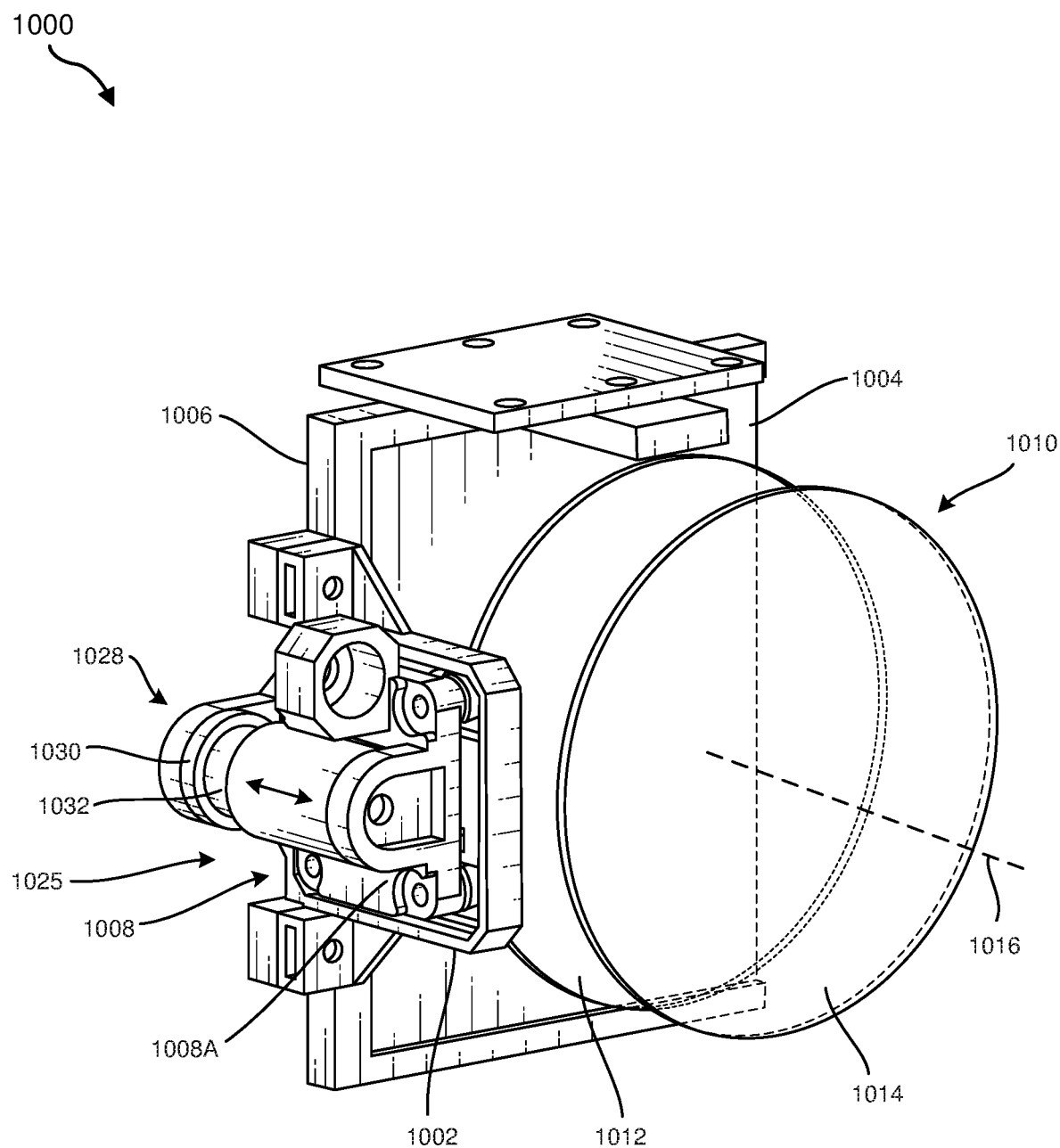
FIG. 10 is a perspective view of a lens movement mechanism including bearing elements, according to at least one embodiment of the present disclosure.
Figure 11:
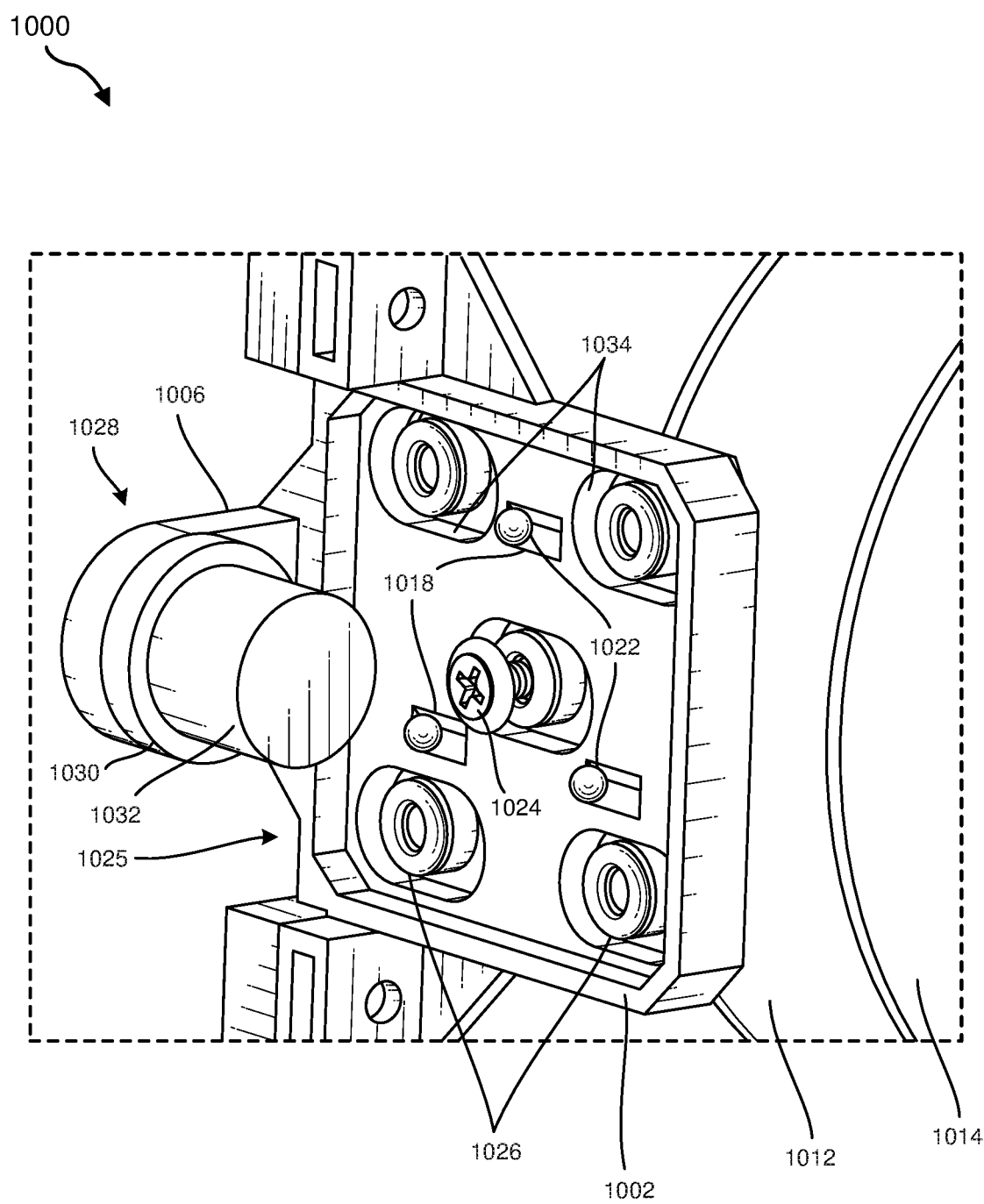
FIGS. 11 and 12 are a detailed perspective views of portions of the lens movement mechanism of FIG. 10.
Figure 12:
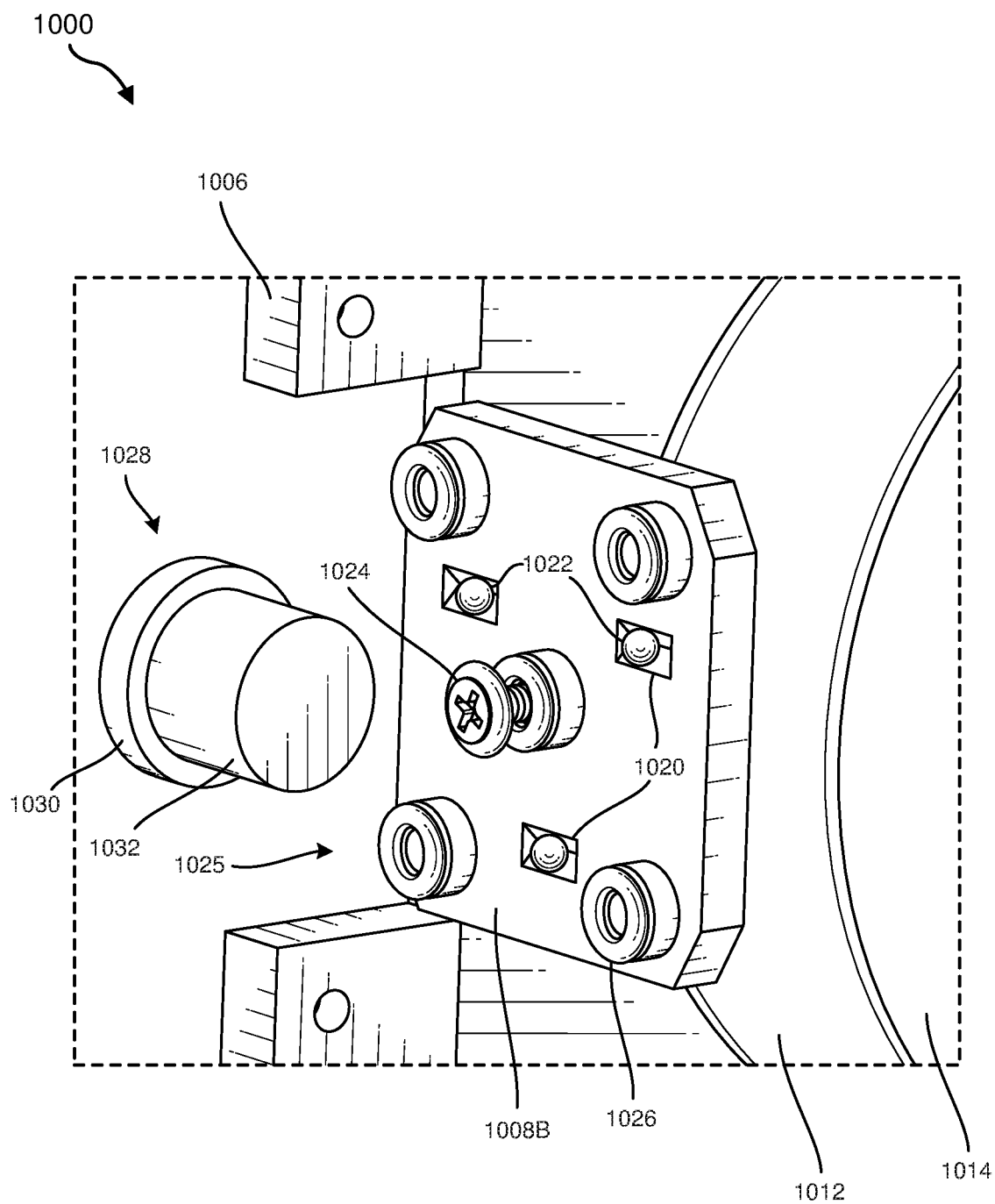
Figure 31:
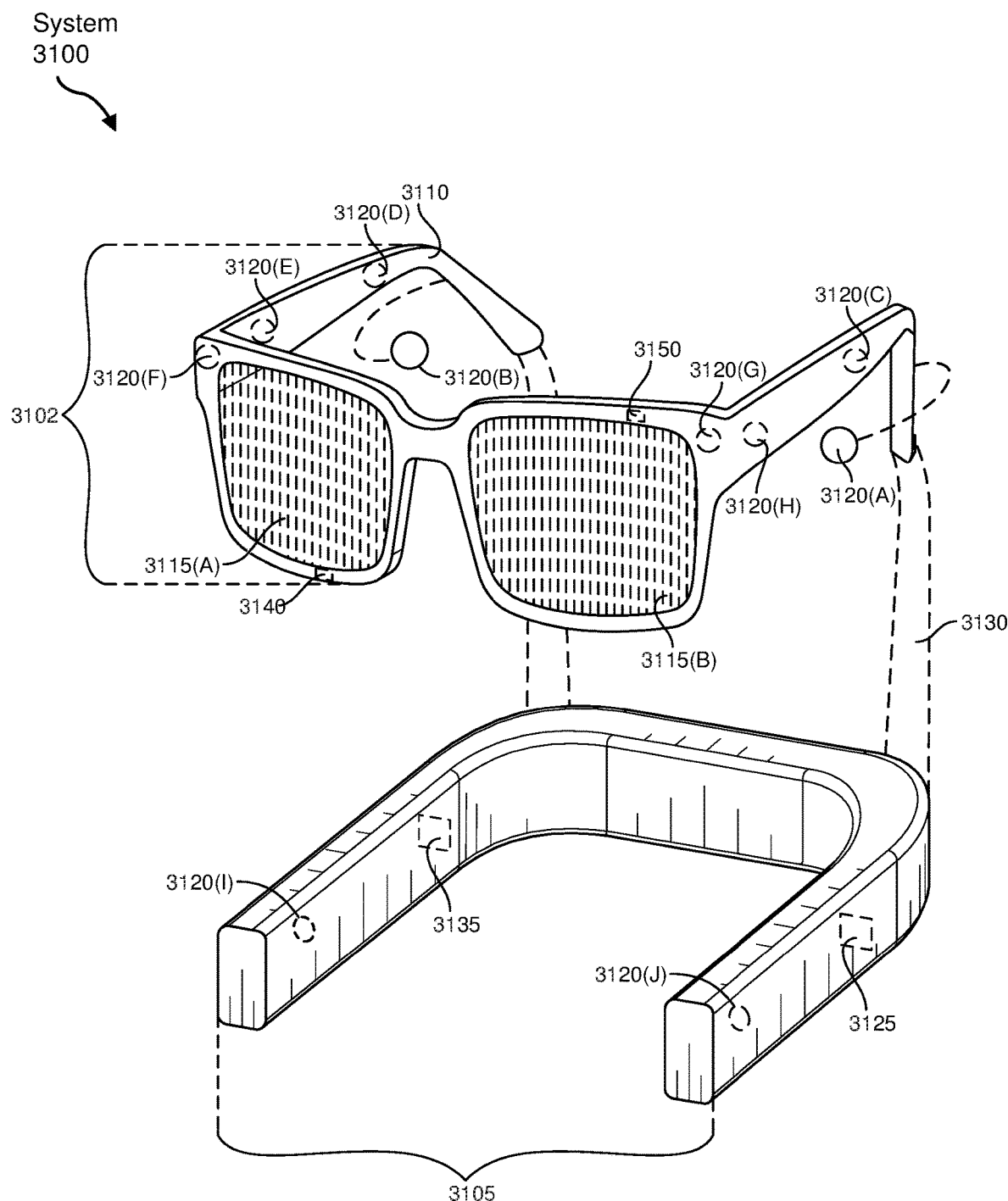
FIG. 31 is an illustration of example augmented-reality glasses that may be used in connection with embodiments of this disclosure.
Figure 32:
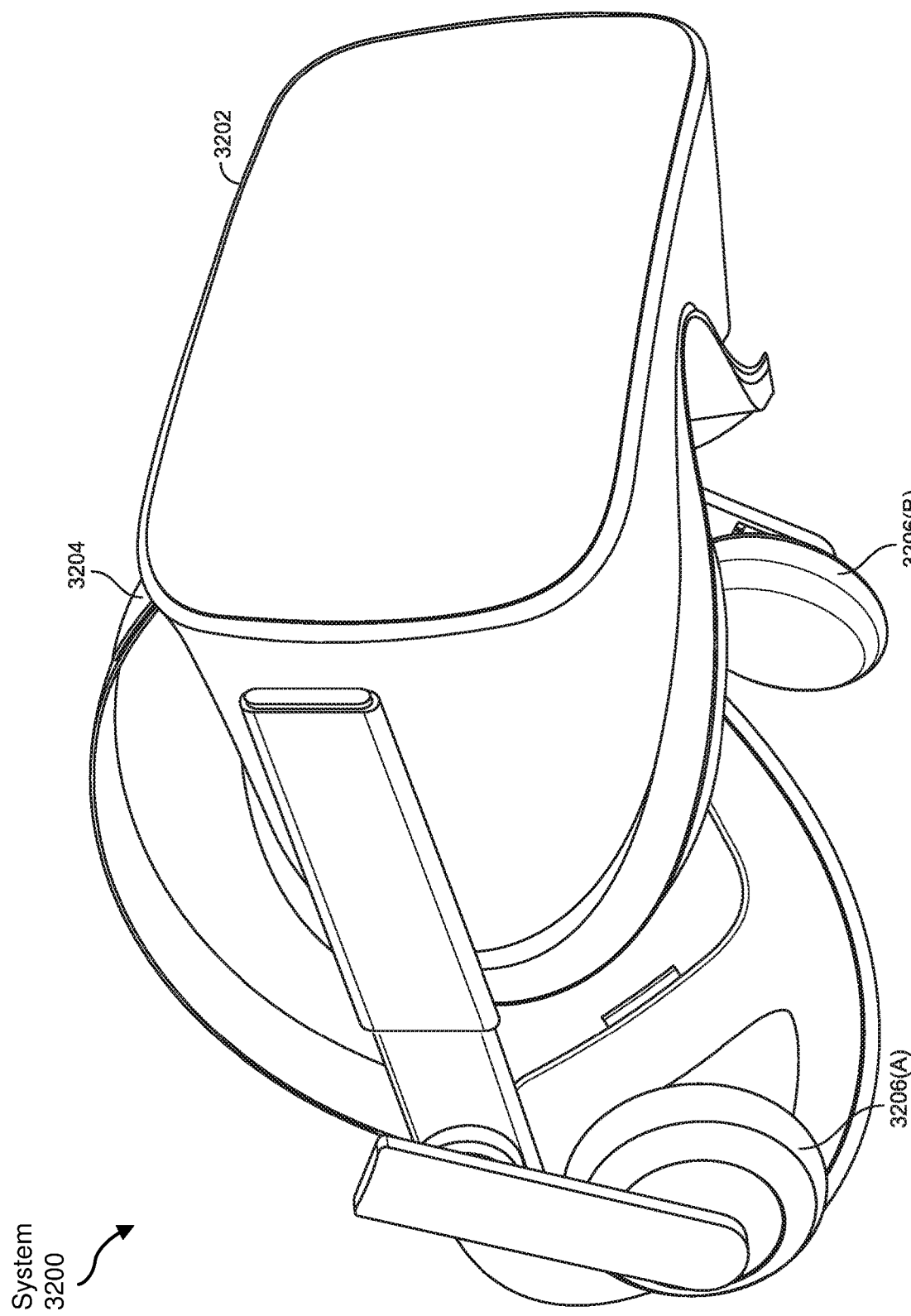
FIG. 32 is an illustration of an example virtual-reality headset that may be used in connection with embodiments of this disclosure.

The following will provide, with reference to FIGS. 1-9, detailed descriptions of systems for varifocal adjustments that include flexure assemblies for guiding movement of a movable optical lens. With reference to FIGS. 10-12, the following will provide detailed descriptions of systems for varifocal adjustments that include ball-bearing assemblies for guiding movement of a movable optical lens. With reference to FIGS. 13-18, the following will provide detailed descriptions of lens movement mechanisms including bearing assemblies. With reference to FIGS. 19-23, the following will provide detailed descriptions of lens movement stop mechanisms for stopping movement of a movable optical lens. With reference to FIGS. 24-27, the following will provide detailed descriptions of various optical assemblies including shock protection elements. With reference to FIGS. 28-30, the following will provide detailed descriptions of various methods related to systems for varifocal adjustments. With reference to FIGS. 31 and 32, the following will provide detailed descriptions of various artificial-reality systems that may include or be implemented with systems for varifocal adjustments.

Referring to FIG. 1, a representation of a user 100 wearing an HMD system 102 is illustrated. Portions of the HMD system 102 are shown as transparent or are omitted for a clear view of underlying elements. As illustrated in FIG. 1, the HMD system 102 may be a virtual-reality HMD system 102, although concepts of the present disclosure are also applicable to other types of systems that may benefit from varifocal adjustments. The HMD system 102 may include a right optical assembly 103A for displaying visual content to a user's right eye and a left optical assembly 103B for displaying visual content to the user's left eye. The right optical assembly 103A and the left optical assembly 103B are collectively referred to as optical assemblies 103. An electronic display 104 may be included in each of the right optical assembly 103A and the left optical assembly 103B. The electronic display 104 is shown in FIG. 1 in the right optical assembly 103A, but a similar electronic display is omitted from the left optical assembly 103B of FIG. 1 for a better view of underlying components. In additional embodiments, a single electronic display 104 may be shared between the right optical assembly 103A and the left optical assembly 103B.

The HMD system 102 may include a frame 106 on which the two optical assemblies 103 are respectively mounted. The optical assemblies 103 may be configured for displaying digital images (e.g., stereoscopic images) to the eyes of the user 100. Each of the optical assemblies 103 may include an optical lens pair 110 including a movable first lens 112 and a stationary second lens 114 ("movable" and "stationary" being with reference to the frame 106) and the electronic display 104 (e.g., a digital display element, such as an LED display, an LCD display, and OLED display, etc.). The first lens 112 may, in some embodiments, be positioned between the second lens 114 and the electronic display 104. The first lens 112 may have a first optical axis 116 and the second lens 114 may have a second optical axis 118. As illustrated in FIG. 1, in some embodiments the first optical axis 116 and the second optical axis 118 may be substantially collinear.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, at least 99% met, or fully met.

Each of the optical assemblies 103 may include a flexure assembly 120. The flexure assembly 120 may be configured to guide movement of the first lens 112 relative to the frame 106. The flexure assembly 120 may include at least one flexure element 122. For example, a first movable end portion 124 of the at least one flexure element 122 may be coupled to the first lens 112 (e.g., to a peripheral edge of the first lens 112), such as via a bracket 125. A second fixed end portion 126 ("fixed" being relative to the frame 106) may be coupled to the frame 106. One or more flexure elements 122 may extend between the first movable end portion 124 and the second fixed end portion 126 of the flexure assembly 120.

As illustrated in FIG. 1, in some examples the at least one flexure element 122 may include more than one flexure element 122, such as a first flexure element 122A and a second flexure element 122B. The first flexure element 122A may be positioned adjacent to a first lateral side (e.g., an upper side) of the first lens 112 and the second flexure element 122B may be positioned adjacent to a second, different lateral side (e.g., a lower side) of the first lens 112. The presence and configuration of the two flexure elements 122, which may be positioned substantially symmetrical about a centerline passing through the first lens 112, may further facilitate the movement of the first lens in the desired direction (e.g., substantially along the optical axis of the first lens) while inhibiting unwanted movement. The flexure elements 122 may be positioned to be outside of the viewing area of the user 100, such that a view of light traveling along (e.g., substantially parallel to) the optical axes 116, 118 and through the optical lens pair 110 from the electronic display 104 may be unimpeded by the flexure element 122.

The first flexure element 122A may include a first end portion 124A that is movable relative to the frame 106 and a second end portion 126A that is fixed relative to the frame 106. Likewise, the second flexure element 122B may include a first end portion 124B that is movable relative to the frame 106 and a second end portion 126B that is fixed relative to the frame 106. Each of the flexure elements 122 may be configured to bend to allow the first lens 112 to move along the first optical axis 116 relative to the frame 106 and relative to the second lens 114. Movement of the first lens 112 relative to the second lens 114 may alter at least one optical property (e.g., a focus) of the optical lens pair 110, as further explained below with reference to FIG. 3. By way of example and not limitation, the first lens 112 may be movable relative to the second lens 114 and relative to the frame 106 over a distance of up to about 4 mm.

The flexure elements 122 may also serve as a guide to constrain movement of the first lens 112 to a particular movement profile. In some examples, the flexure elements 122 may be configured to maintain substantially linear movement of the first lens 112, such as along the first optical axis 116. Any deviation from linear movement (e.g., a rotational movement, a torsional movement, and/or a translational movement) may be predictable based on the geometry and configuration of the flexure elements 122. Such predictable deviations, if present, may be accounted for by the HMD system 102, such as by counteracting any change in optical properties (e.g., optical distortions) with software that may make corresponding alterations to an image displayed on the electronic display 104.

Each of the flexure elements 122 may be or include a substantially planar element when in a resting (e.g., unbent) state. A central portion of each of the flexure elements 122 may be stiffened, such as by providing the central portion with a greater relative thickness than end portions thereof. For example, a stiffener material may be adhered, welded, brazed, overmolded, fastened, or otherwise coupled to each of the flexure elements 122. In additional examples, a unitary, integral material may be molded, extruded, machined, or otherwise formed to include a central portion with a higher thickness (and consequently a higher stiffness) than end portions thereof. The flexure assembly 120 may include at least two flexure elements 122 that are spaced apart from each other by a gap to provide for relative ease of bending in a desired direction (e.g., about an axis extending parallel to and across a width of a major plane of the flexure elements 122) and relative stiffness in a torsional direction (e.g., about an axis extending along a length of the flexure elements 122). This configuration may facilitate movement of the first lens 112 in a desired direction (e.g., substantially along the first optical axis 116 of the first lens 112) while inhibiting (e.g., reducing or eliminating) other movement, such as off-axis rotation (e.g., twisting). Example configurations of and details regarding the flexure assembly 120 and flexure elements 122 thereof are described below.

The first and second lenses 112, 114 may be, for example, Fresnel lenses, convex lenses, concave lenses, or a combination thereof. A material of the lenses 112, 114 may include a polymer material (e.g., polycarbonate), a glass material, a crystalline material, or any other suitable optical lens material. In some embodiments, one or more of the lenses 112, 114 may have one or more coatings, such as anti-reflective coatings.

Figure 2:
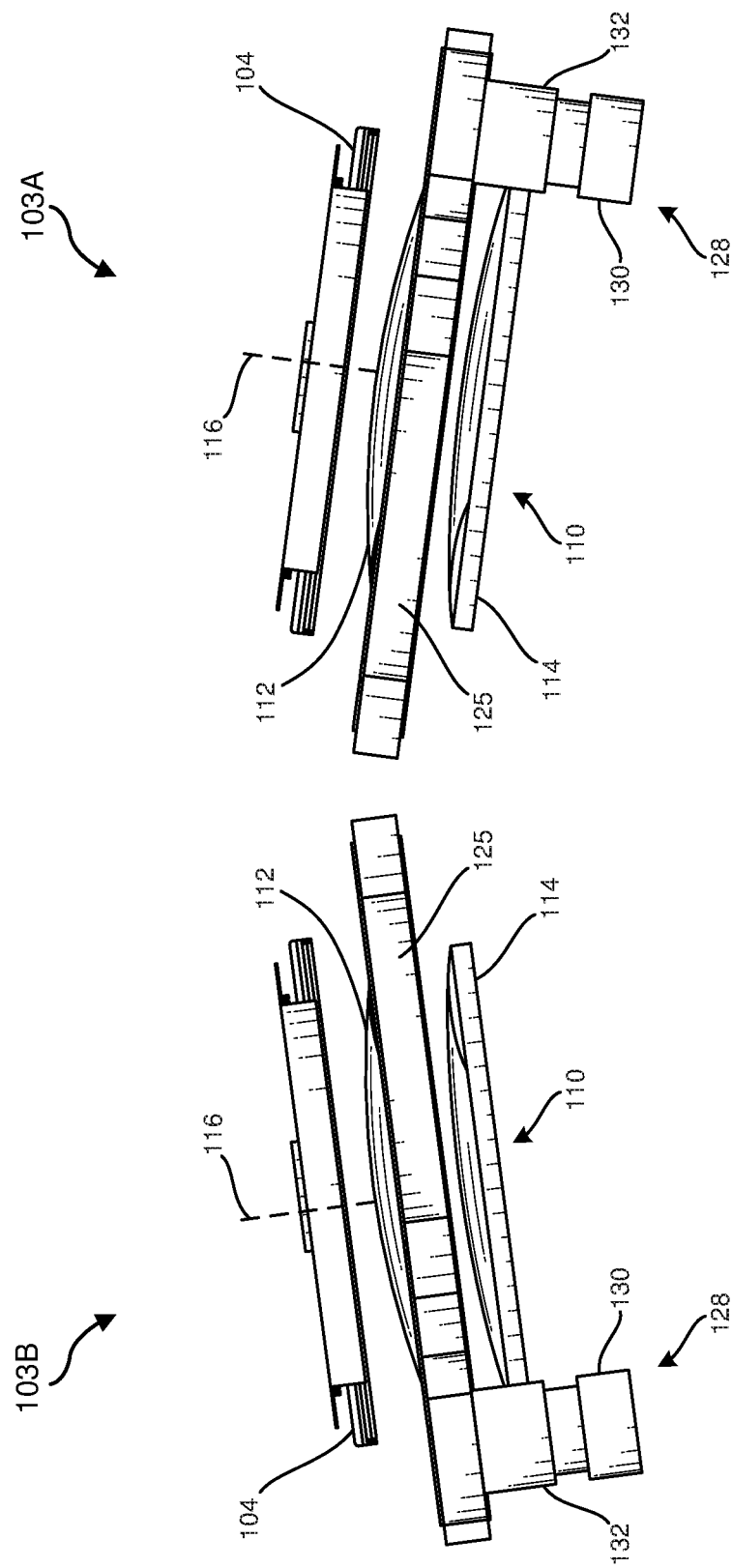
FIG. 2 is a top view of optical assemblies of the HMD of FIG. 1, according to at least one embodiment of the present disclosure.

FIG. 2 illustrates a top view of the optical assemblies 103A and 103B. As shown in FIG. 2 and as discussed above, each of the right optical assembly 103A and the left optical subassembly 103B may include the electronic display 104, the movable first lens 112, and the fixed second lens 114. The first lens 112 and the second lens 114 of each of the optical assemblies 103 may form an optical lens pair 110. The first lens 112 of each of the optical assemblies 103 may be movable in response to actuation of an actuator 128. For example, the actuator 128 may be a stepper motor, a brushless DC motor, a voice-coil actuator ("VCA"), a piezo-electric actuator, a linear actuator, etc. A base 130 of the actuator 128 may be fixedly coupled to the frame 106 (FIG. 1), and an output shaft 132 of the actuator 128 may be coupled to the first lens 112, such as via the bracket 125. Alternatively, the orientation of the actuator 128 may be reversed, with the base 130 coupled to the first lens 112 and the output shaft 132 coupled to the frame 106. The actuator 128 may be oriented such that movement of the output shaft 132 occurs substantially parallel to the first optical axis 116 of the first lens 112, resulting in movement of the first lens 112 substantially along the first optical axis 116.

The movable first lens 112 is illustrated in FIG. 2 as being positioned between (e.g., directly between) the electronic display 104 and the fixed second lens 114. In additional embodiments, the movable first lens 112 may be positioned in place of the second lens 114, and the second lens 114 may be positioned in place of the first lens 112. In such embodiments, the fixed second lens 114 may be positioned between the electronic display 104 and the movable first lens 112.

Figure 3:
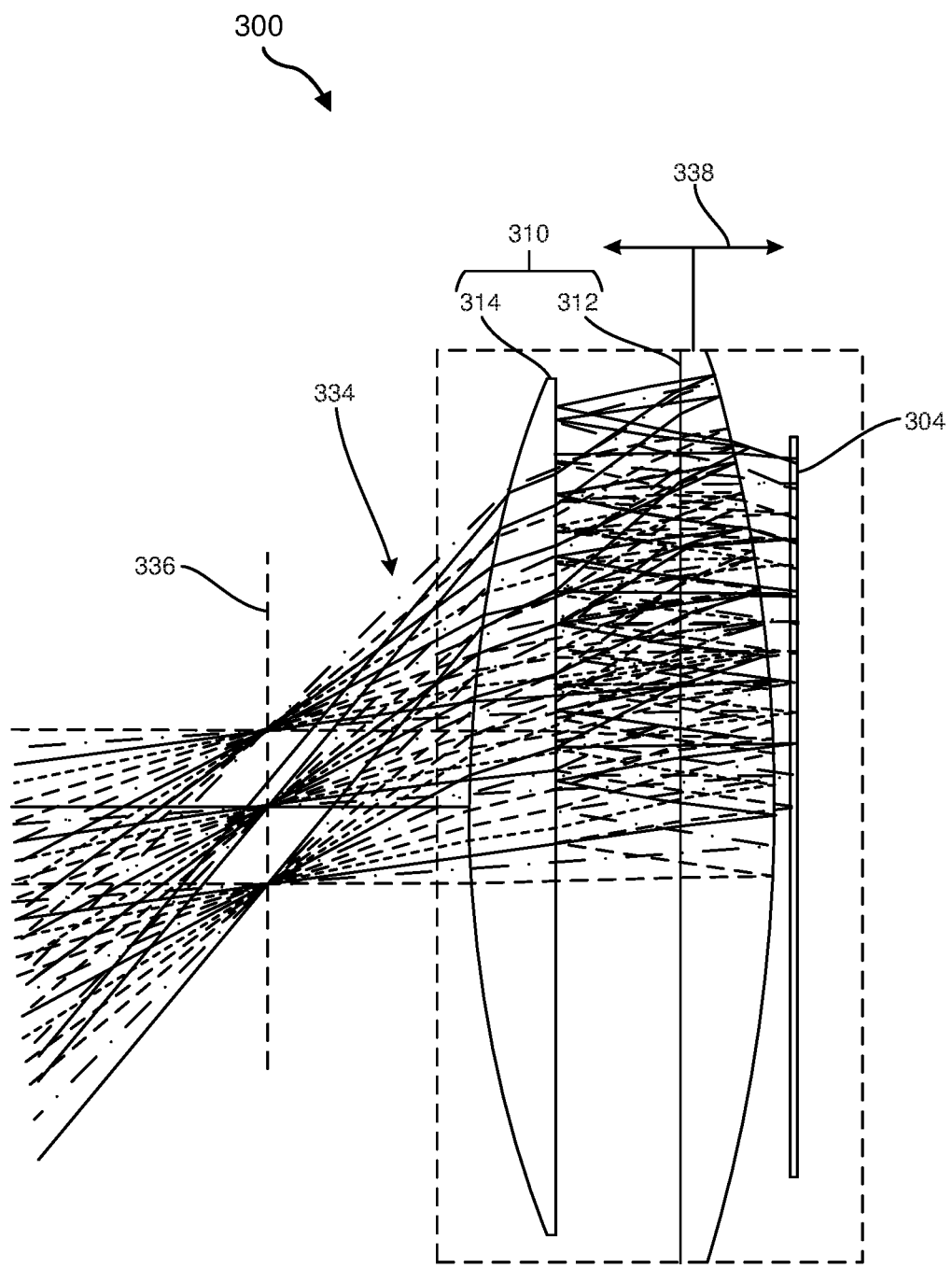
FIG. 3 is a schematic side view of an optical assembly of an HMD, according to at least one embodiment of the present disclosure.

FIG. 3 illustrates a schematic side view of an optical assembly 300, with optical rays 334 shown to demonstrate the movement of light from the electronic display 304 through an optical lens pair 310 including a movable first lens 312 and a fixed second lens 314. In some examples, the optical assembly 300 may represent one or both of the optical assemblies 103 of FIGS. 1 and 2. The optical rays 334 may converge at a focal plane 336, which may be configured to be at a user's eye (e.g., at a user's pupil) for viewing an image generated by the electronic display 304. As the first lens 312 is moved toward or away from the second lens 314 as indicated by arrows 338, such as by activation of the actuator 128 (FIG. 2), a focal point (e.g., a location of the focal plane 336) of the optical assembly 300 may be adjusted. Accordingly, movement of the first lens 312 may result in a change of at least one optical property (e.g., focus) of the optical assembly 300.

Figure 4:
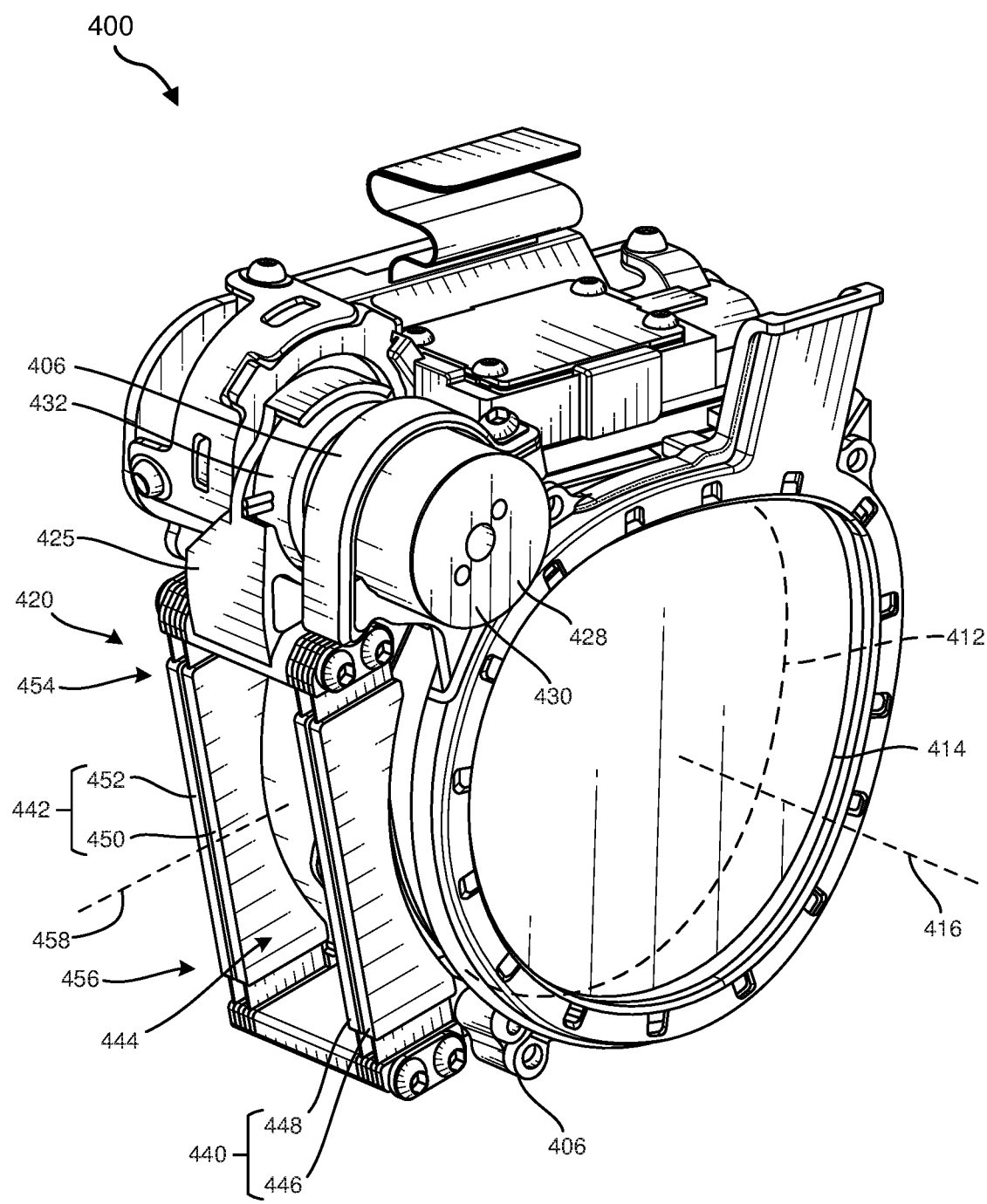
FIG. 4 is a perspective view of an optical assembly of an HMD including a flexure assembly, according to at least one embodiment of the present disclosure.
Figure 5:
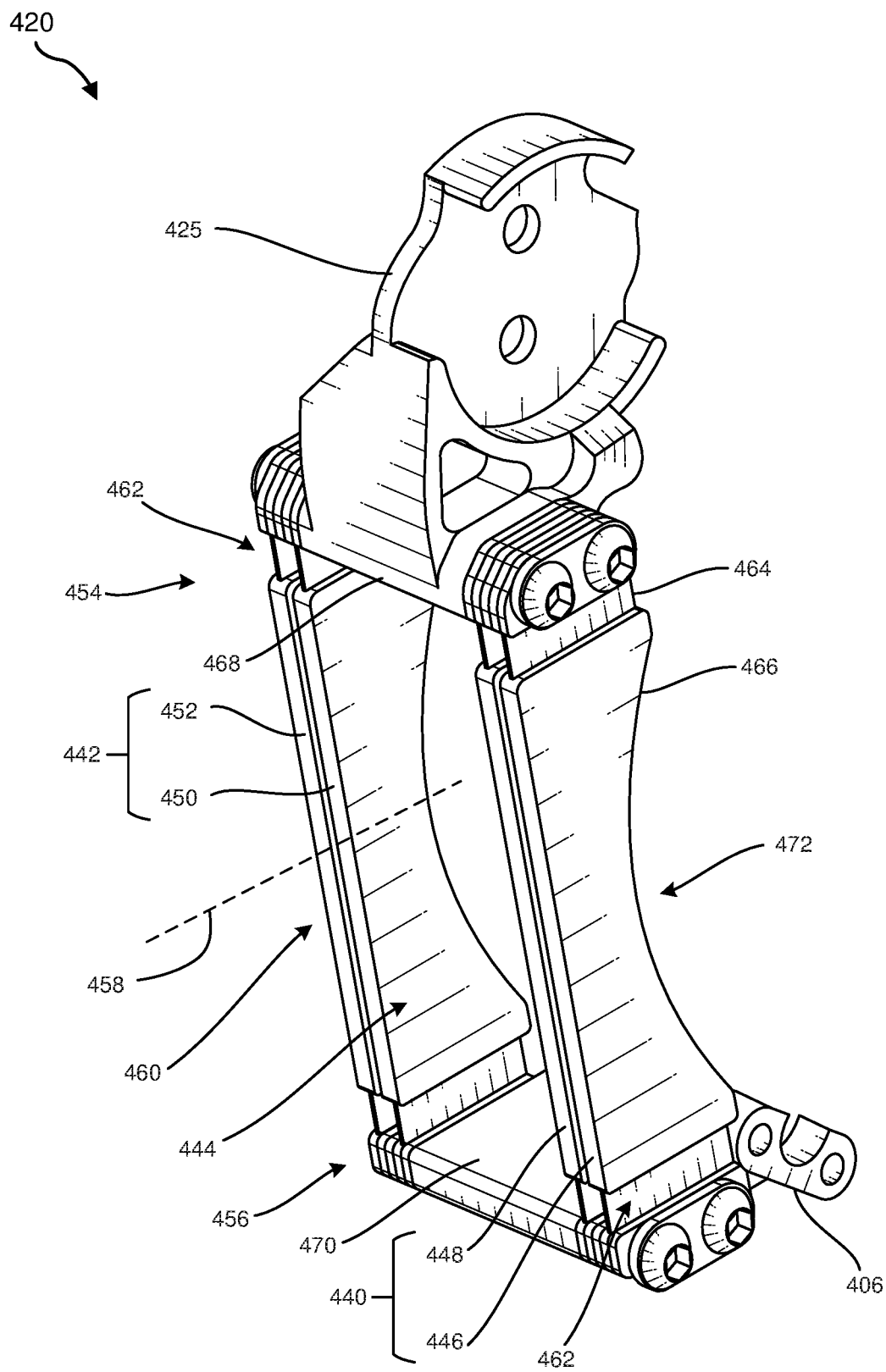
FIG. 5 is a detailed perspective view of the flexure assembly of FIG. 4, according to at least one embodiment of the present disclosure.

FIG. 4 is a perspective view of an optical assembly 400 of an HMD system including a flexure assembly 420. FIG. 5 is a detailed perspective view of the flexure assembly 420 of the HMD system. The optical assembly 400 may represent one or both of the optical assemblies 103 of FIGS. 1 and 2. As shown in FIGS. 4 and 5, the flexure assembly 420 may include a first flexure pair 440 and a second flexure pair 442, which may be separated from each other by a gap 444. The first flexure pair 440 may include a first flexure element 446 adjacent to a second flexure element 448. The second flexure pair 442 may include a third flexure element 450 adjacent to a fourth flexure element 452. A movable first end portion 454 (e.g., the upper end portion in the view of FIGS. 4 and 5) of the flexure assembly 420 may be coupled to a movable first lens 412 (shown in dashed lines in FIG. 4) of the optical assembly 400, such as via a bracket 425. A fixed second end portion 456 (e.g., the lower end portion in the view of FIGS. 4 and 5) of the flexure assembly 420 may be coupled to a frame 406 of the HMD system.

The flexure elements 446, 448, 450, 452 may be configured to facilitate bending of the flexure assembly 420 in a desired direction (e.g., about an axis parallel to bending axis 458, which extends parallel to and across a width of a major plane of the flexure elements 446, 448, 450, 452) while providing relative stiffness in a torsional direction (e.g., about an axis extending along a length of the flexure elements 446, 448, 450, 452). This configuration may result in movement of the first lens 412 substantially along an optical axis 416 thereof upon actuation of an actuator 428.

The actuator 428 may be positioned and configured to move the first end portion 454 of the flexure assembly 420 and the first lens 412 relative to the frame 406. For example, a base 430 of the actuator 428 may be coupled to the frame 406 and an output shaft 432 of the actuator 428 may be coupled to the bracket 425, which in turn may be coupled to the first lens 412.

As shown in FIG. 5, each of the flexure elements 446, 448, 450, 452 may include an enlarged central region 460 that has greater stiffness than end regions 462 thereof. Each of the flexure elements 446, 448, 450, 452 may include a base member 464 and a stiffener material 466 on the base member 464 in the central region 460. In some embodiments, the stiffener material 466 and the base member 464 may be a unitary, integral material, such as may be formed by molding, extruding, or machining a material to form the flexure elements 446, 448, 450, 452. In additional embodiments, the stiffener material 466 may be coupled to the base member 464, such as by an adhesive, by overmolding the stiffener material 466 on the base member 464, by fastening the stiffener material 466 to the base member 464, by welding the stiffener material 466 to the base member 464, by brazing the stiffener material 466 to the base member 464, or a combination thereof. The stiffener material 466 may be positioned on one side of the base member 464, on opposing sides of the base member 464, or surrounding the base member 464 in the central region 460.

In some embodiments, the base member 464 may be or include, for example, a metal material. For example, the metal material may be a titanium material or a steel material (e.g., a stainless-steel material). The stiffener material 466 may be or include, for example, a metal material, a polymer material, or a ceramic material. By way of example, the stiffener material 466 may be an epoxy material. The base material 464 may have a thickness of about 0.003 inch or less, such as about 0.002 inch or about 0.001 inch. The thickness of the base material 464 may affect a force required to move the first lens 412 and a mechanical stress experienced by the base material 464 when the first lens 412 is moved. A width of the base material 464 may also affect the force required to move the first lens 412. In some examples, the actuation force for moving the first lens 412 a distance of about 2 mm may be less than 0.1 N.

The central region 460 of each of the flexure elements 446, 448, 450, 452 may have a greater thickness than the base member 464, such as about 0.003 inch or more, such as about 0.004 inch, about 0.005 inch, or about 0.006 inch. The greater thickness of the central region 460 may result in the central region 460 having a greater stiffness than the end regions 462, which may lack the stiffener material 466. Thus, the end regions 462 may form living hinges, which may be regions where the base material 464 bends upon activation of the actuator 428 (FIG. 4).

The gap 444 may be maintained by a first end block 468 and a second end block 470. The first end block 468 may be coupled to the first end portion 454 of each of the flexure elements 446, 448, 450, 452. The second end block 470 may be coupled to the second end portion 456 of each of the flexure elements 446, 448, 450, 452. The first end block 468 and the second end block 470 may have a length defining the gap 444. The presence of the gap 444 and the respective widths of the flexure elements 446, 448, 450, 452 may strengthen the flexure assembly 420 against torsional bending (e.g., bending about an axis parallel to a length of the flexure elements 446, 448, 450, 452) when the first lens 412 is moved by activation of the actuator 428.

In some examples, an inner side of the flexure elements 446, 448, 450, 452 may include a concave cutout 472, such as to provide space for other elements of the optical assembly 400, such as the first lens 412 and/or the second lens 414.

In some embodiments, an outer side of the flexure elements 446, 448, 450, 452 may also be curved (e.g., may be convex). Each of the flexure elements 446, 448, 450, 452 may be substantially planar when in a state of rest (e.g., when the actuator 428 has not forced the flexure elements 446, 448, 450, 452 into a bent state).

Figure 6:
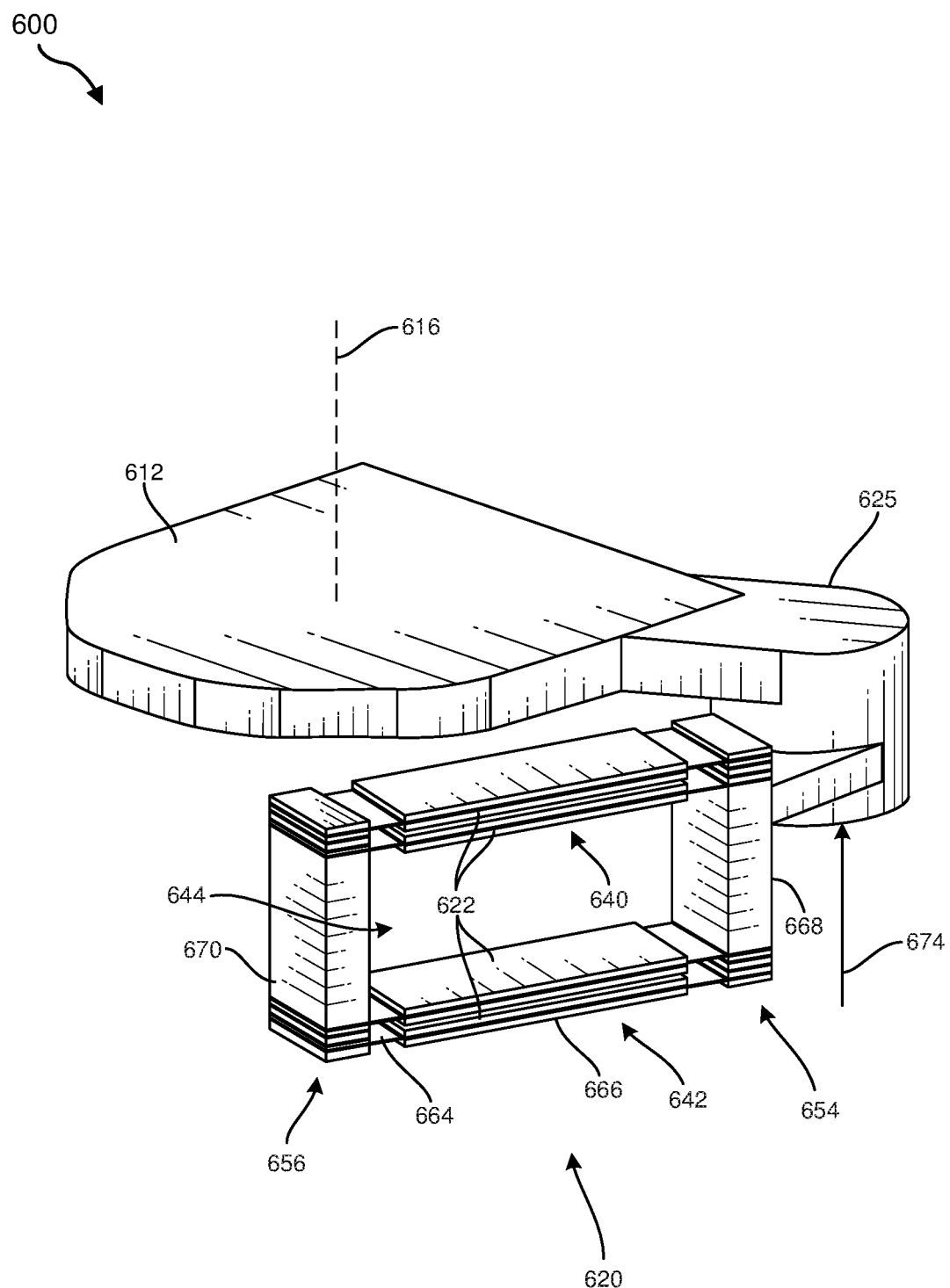
FIG. 6 is a perspective view of a lens movement mechanism including a flexure assembly, according to at least one embodiment of the present disclosure.

FIG. 6 is a perspective view of a lens movement mechanism 600 including a flexure assembly 620. As shown in FIG. 6, the flexure assembly 620 may include a movable first end portion 654 that is coupled to a movable optical lens 612 via a bracket 625. The bracket 625 may be shaped and sized for coupling to an output shaft of an actuator, such as a VCA, linear actuator, brushless DC motor, stepper motor, piezoelectric actuator, etc. A force 674 may be applied by the actuator to the bracket 625 to bend the flexure assembly 620 and to move the optical lens 612 in a desired direction (e.g., along an optical axis 616 of the optical lens 612). A fixed second end portion 656 of the flexure assembly may be coupled to a frame of an HMD system.

The flexure assembly 620 may include first group 640 of two or more flexure elements 622 (at an upper side of the flexure assembly 620 in the view of FIG. 6) and second group 642 of two or more flexure elements 622 (at a lower side of the flexure assembly 620 in the view of FIG. 6). As described above, the flexure elements 622 may each include a base member 664 and an enlarged central region 660 with a stiffener material 666. The first group 640 of flexure elements 622 may be separated from the second group 642 of flexure elements 622 by a gap 644, which may increase a torsional stiffness of the flexure assembly 620 while allowing bending in a desired direction. The gap 644 may be defined and maintained by a first end block 668 and a second end block 670. The flexure assembly 620 may guide the movement of the optical lens 612 by constraining movement of the optical lens 612 to movement substantially in the desired direction (e.g., along the optical axis 616 of the optical lens 612).

Figure 7:
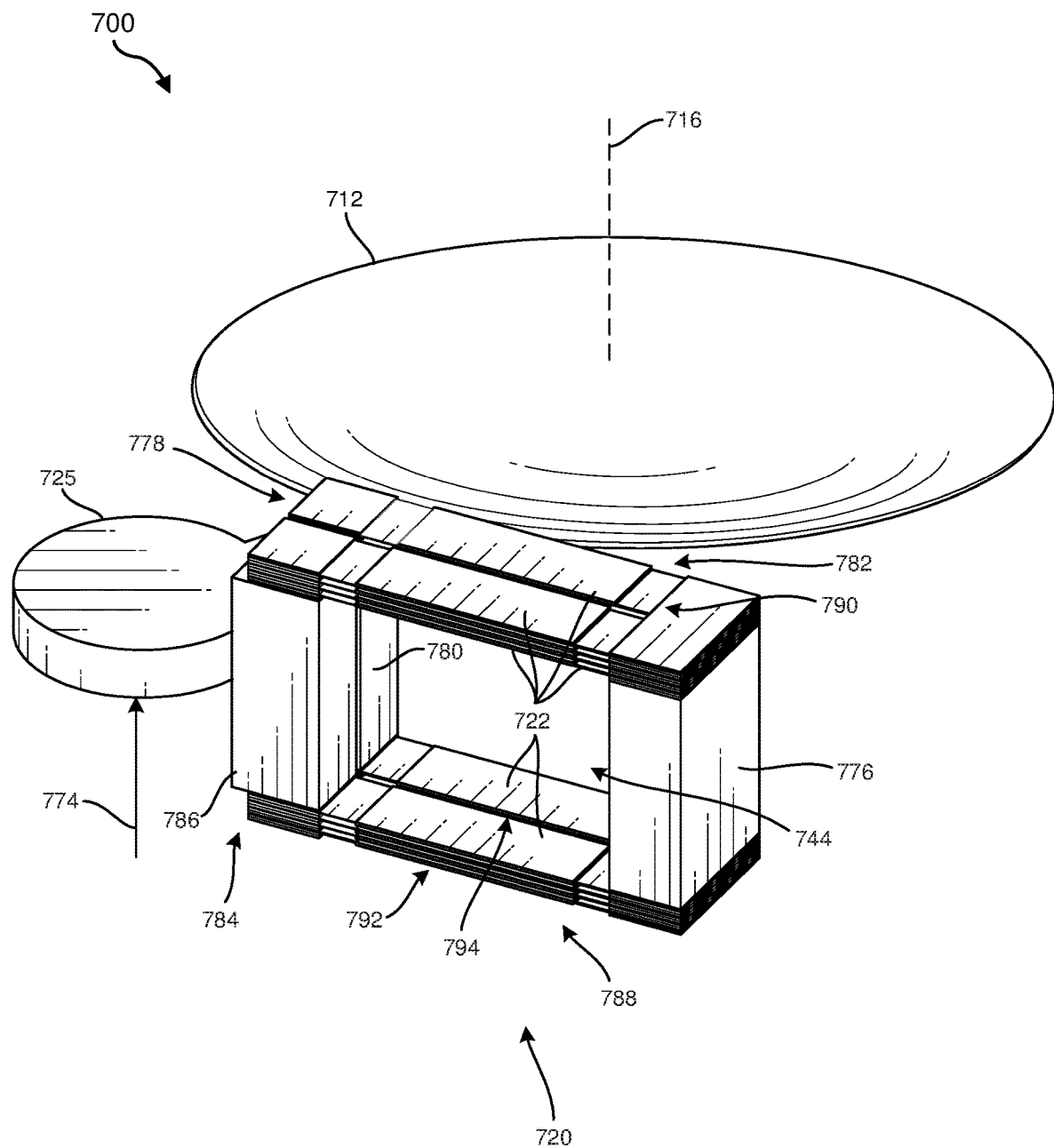
FIG. 7 is a perspective view of a lens movement mechanism including a flexure assembly, according to at least one additional embodiment of the present disclosure.

FIG. 7 is a perspective view of a lens movement mechanism 700 including a flexure assembly 720, according to at least one additional embodiment of the present disclosure. The flexure assembly 720 may be configured and positioned to guide movement of an optical lens 712, such as substantially along an optical axis 716 thereof. In this example, the flexure assembly 720 may include flexure elements 722 in a split configuration and an intermediate block 776. A first movable end portion 778 of the flexure assembly 720 is illustrated at a back-left portion of the flexure assembly 720 in FIG. 7. The first movable end portion 778 of the flexible assembly 720 may be coupled to the optical lens 712, such as via a first end block 780 and a bracket 725. The bracket 725 may be positioned and configured for application of a force 774 by an actuator to move the optical lens 712. A first flexure set 782 may extend from the first movable end portion 778 (e.g., from the first end block 780) to the intermediate block 776. The intermediate block 776 is illustrated at a lower right portion of the flexure assembly 720 in the view of FIG. 7. The first flexure set 782 is illustrated at a back of the flexure assembly 720 in FIG. 7. A second fixed end portion 784 of the flexure assembly 720 may be coupled to a frame of an HMD system, such as via a second end block 786. The second fixed end portion 784 of the flexure assembly 720 is illustrated at a front left portion of the flexure assembly 720 in FIG. 7. A second flexure set 788 may extend between the intermediate block 776 and the second fixed end portion 784 (e.g., the second end block 786) of the flexure assembly 720. The second flexure set 788 is illustrated at a front portion of the flexure assembly in the view of FIG. 7.

As shown in FIG. 7, the first and second flexure sets 782, 788 may each include two or more (e.g., three, four, etc.) front flexure elements 790 and two or more (e.g., three, four, etc.) rear flexure elements 792. The front flexure elements 790 may be flexure elements 722 positioned toward a front of the lens movement mechanism 700, shown at an upper part of the flexure assembly 720 in FIG. 7. The rear flexure elements 792 may be flexure elements 722 positioned toward a rear of the lens movement mechanism 700, shown at a lower part of the flexure assembly 720 in FIG. 7. The front flexure elements 790 may be separated from the rear flexure elements 792 by a gap 744. In embodiments in which there are four front flexure elements 790 and four rear flexure elements 792 in each of the flexure sets 782, 788, as illustrated in FIG. 7, these flexure sets 782, 788 may exhibit a substantially similar stiffness in a desired bending direction as comparable flexure sets with two front flexure elements and two rear flexure elements that may have the same thickness and material properties but twice the width (e.g., like the flexure assembly 620 of FIG. 6).

The first flexure set 782 may be separated from the second flexure set 788 by a slit 794, resulting in the split configuration. The split configuration of the flexure assembly 720 of FIG. 7 may enable increased movement of the optical lens 712 in a desired direction while shortening a length of the flexure assembly 720. This may enable the flexure assembly 720 to fit in a smaller space compared to a non-split configuration. In addition, the split configuration may improve a linearity of movement of the optical lens 712. For example, moving an optical lens with a flexure assembly having a non-split configuration may result in cross-axis translation (e.g., radial translation) relative to the optical axis 716 (e.g., straightness error/decenter through travel) in the form of a parasitic arc-like path. This straightness error may be substantially predictable and may be accounted for and counteracted by software and/or hardware adjustments. On the other hand, moving an optical lens with the flexure assembly 720 having a split configuration like that shown in FIG. 7 may mechanically result in substantially linear movement of the optical lens 712 along the optical axis 716. For example, application of the force 774 on the bracket 725 may result in movement of the first end block 780 and bending of the first flexure set 782. The intermediate block 776 may also move, resulting in bending of the second flexure set 788. Any cross-axis translation of the intermediate block 776 due to bending of the second flexure set 788 may be counteracted by a substantially equal and opposite cross-axis translation of the first movable end portion 778 of the flexure assembly 720 due to bending of the first flexure set 782.

A bending stiffness and/or a torsional stiffness of the flexure assembly 720 (or of any of the other flexure assemblies described herein) may be altered by adjusting one or more of the following example parameters: a thickness of the flexure element base members, a thickness of the flexure element stiffener materials, a length of the stiffener materials applied to the base members, a width of the flexure elements, a contour of the flexure elements, a length of the flexure elements, a quantity of flexure elements in each flexure set, a distance between the front flexure elements and the rear flexure elements (e.g., a length of the gap between the front flexure elements and the rear flexure elements), a material selection and/or material properties of the base members of the flexure elements, a material selection and/or material properties of the stiffener material of the flexure elements, etc.

Figure 8:
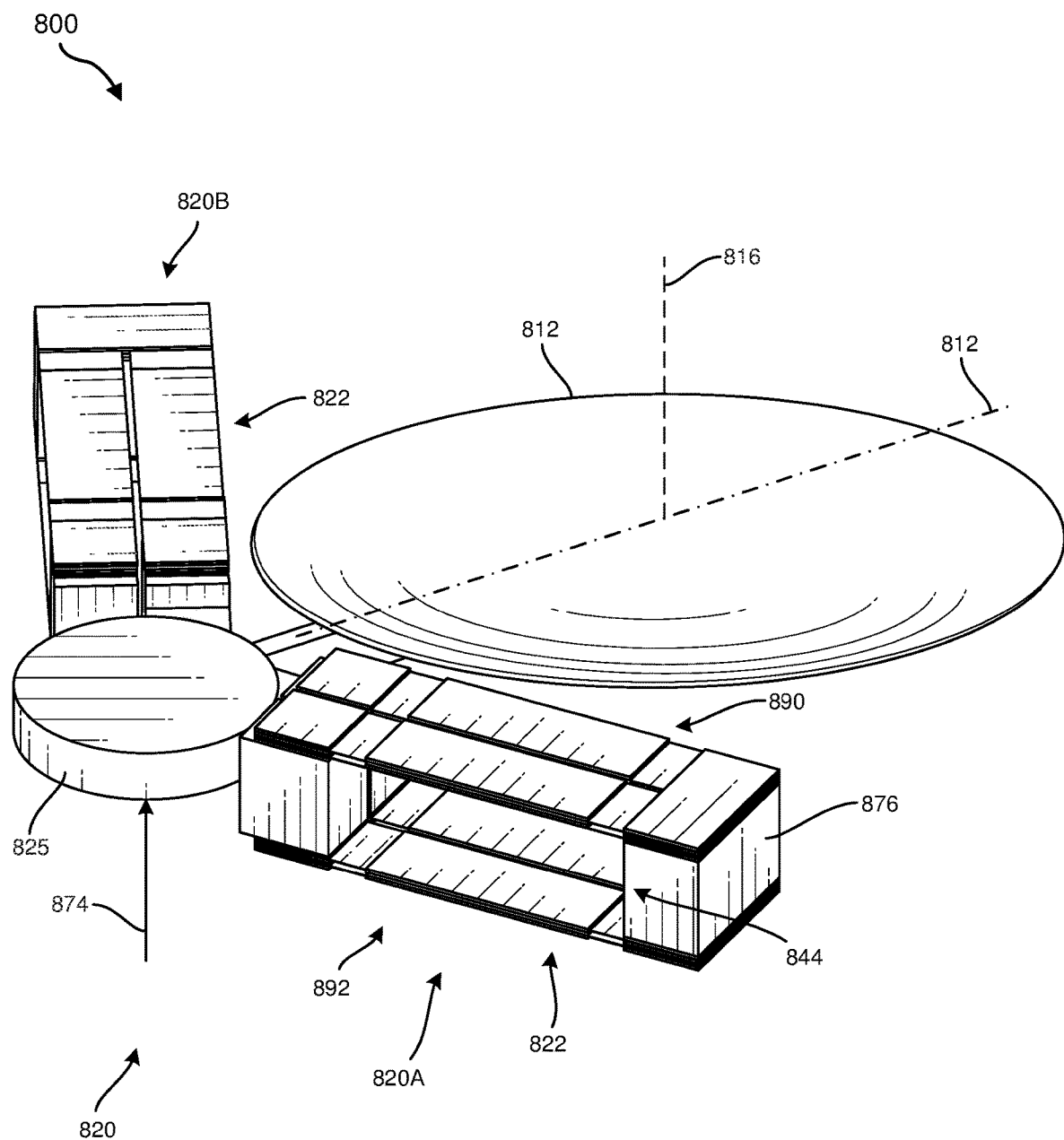
FIG. 8 is a perspective view of a lens movement mechanism including a flexure assembly, according to at least one further embodiment of the present disclosure.

FIG. 8 is a perspective view of a lens movement mechanism 800 including a flexure assembly 820, according to at least one further embodiment of the present disclosure. The flexure assembly 820 may be configured and positioned to guide movement of an optical lens 812, such as substantially along an optical axis 816 thereof. In this example, the flexure assembly 820 may include a first flexure subassembly 820A including split flexure elements 822 and an intermediate block 876 and a second flexure subassembly 820B including split flexure elements 822 and an intermediate block. The first flexure subassembly 820A and the second flexure subassembly 820B may be positioned on symmetrically opposite sides of the optical lens 812 (e.g., symmetrically about a centerline 813 of the optical lens 812 passing through the optical axis 816). Each of the flexure subassemblies 820A, 820B of the lens movement mechanism 800 of FIG. 8 may be similar to the flexure assembly 720 of the lens movement mechanism 700 of FIG. 7.

In the example illustrated in FIG. 8, each flexure subassembly 820A, 820B is shown with two front split flexure elements 890 and two rear split flexure elements 892. The distance between the front split flexure elements 890 and the rear split flexure elements 892 (e.g., a length of a gap 844 between the front split flexure elements 890 and the rear split flexure elements 892) may be smaller in the embodiment shown in FIG. 8 compared to the embodiment shown in FIG. 7. The presence of the two flexure subassemblies 820A, 820B in the lens movement mechanism 800 of FIG. 8 may enable the gap 844 between the front split flexure elements 890 and the rear split flexure elements 892 to be smaller, while still providing a torsional stiffness that is substantially the same as provided by the flexure assembly of FIG. 7. In addition, the symmetrical arrangement of the two flexure subassemblies 820A, 820B may further inhibit (e.g., reduce or eliminate) any off-axis movement (e.g., torsional twisting, cross-axis translation, etc.) of the optical lens 812 when an actuation force 874 is applied to the optical lens 812, such as via a bracket 825.

Figure 9:
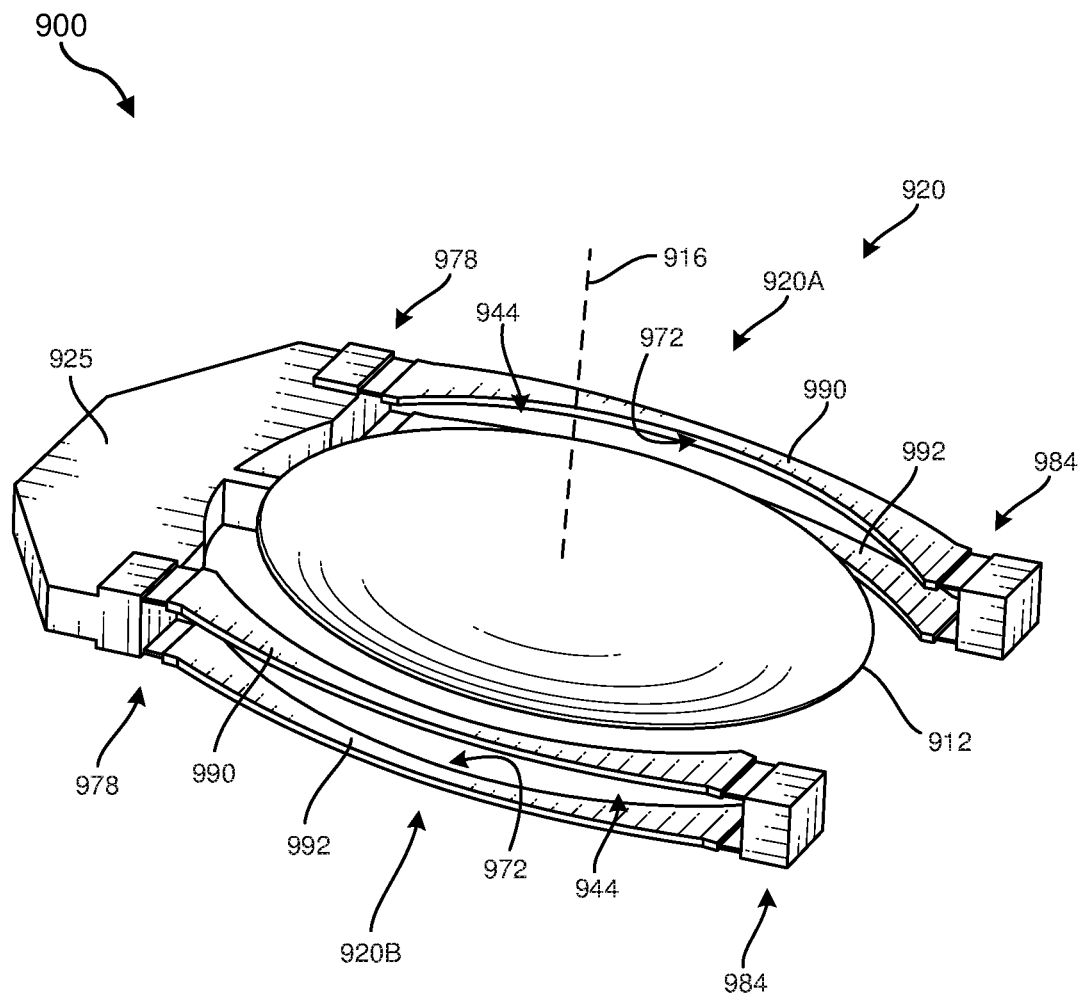
FIG. 9 is a perspective view of a lens movement mechanism including a flexure assembly, according to at least one other embodiment of the present disclosure.

FIG. 9 is a perspective view of a lens movement mechanism 900 including a flexure assembly 920, according to at least one other embodiment of the present disclosure. The flexure assembly 920 may be configured and positioned to guide movement of an optical lens 912, such as substantially along an optical axis 916 thereof. In this example, the flexure assembly 920 may include a first flexure subassembly 920A positioned on one side of the optical lens 912 and a second flexure subassembly 920B positioned on an opposite side of the optical lens 912. Each of the flexure subassemblies 920A, 920B may include a front flexure element 990 and a rear flexure element 992 separated by a gap 944. In some embodiments, the front flexure element 990 and the rear flexure element 992 of the flexure subassemblies 920A, 920B may each include a concave cutout 972, such as to accommodate the optical lens 912 and to avoid obstructing a view through the optical lens 912.

A first movable end portion 978 of each flexure subassembly 920A, 920B may be coupled to the optical lens 912, such as via a bracket 925. A second fixed end portion 984 each flexure subassembly 920A, 920*b* may be coupled to a frame of an HMD system. The first movable end portion 978 may be positioned proximate a first side of the optical lens 912, and the second fixed end portion 984 may be positioned proximate a second, opposite side of the optical lens 912. As illustrated in FIG. 9, respective lengths of the first and second flexure subassemblies 920A, 920B may be substantially parallel to each other. In other words, the first and second flexure subassemblies 920A, 920B may be substantially symmetrically located relative to the optical lens 912. The symmetry of the configuration shown in FIG. 9 may improve an off-axis stiffness of the lens movement mechanism 900 compared to other non-symmetrical configurations.

FIG. 10 is a perspective view of a lens movement mechanism 1000 including bearing elements, according to at least one embodiment of the present disclosure. FIGS. 11 and 12 are detailed perspective views of portions of the lens movement mechanism 1000 of FIG. 10. The lens movement mechanism 1000 may be configured to guide movement of a movable optical lens 1012 relative to a fixed optical lens 1014, an electronic display 1004, and a frame 1006 of an HMD system supporting the fixed optical lens 1014 and the electronic display 1004. As shown in FIGS. 10-12, the lens movement mechanism 1000 may include a bracket assembly 1025 coupled to the movable optical lens 1012. The bracket assembly 1025 may include a fixed bracket portion 1002 and a movable bracket portion 1008. The fixed bracket portion 1002 may be positioned between (e.g., sandwiched between) an outer movable bracket portion 1008A and an inner movable bracket portion 1008B of the movable bracket 1008. The fixed bracket portion 1002 is illustrated in FIG. 11. The outer movable bracket portion 1008A is illustrated in FIG. 10 and the inner movable bracket portion 1008B is illustrated in FIG. 12.

The bracket assembly 1025 may include one or more outer bearing guides 1018 (FIG. 11) and one or more inner bearing guides 1020 (FIG. 12). For example, the bearing guides 1018, 1020 may include V-shaped grooves, formed sheet metal grooves, sheet metal inserts, dowel pins, ceramic plate inserts, ceramic rod inserts, needle roller bearings (which may include, for example, ceramic and/or metal), etc., which may each act as a guide for respective bearing elements 1022. Three outer bearing guides 1018 and three inner bearing guides 1020 are respectively illustrated in FIGS. 11 and 12, although other numbers of bearing guides 1018, 1020 may be included in different embodiments. As shown in FIG. 11, the outer bearing guides 1018 may be formed in a surface of the fixed bracket portion 1002, with corresponding outer bearing guides 1018 also formed in a surface of the outer movable bracket portion 1008A. As shown in FIG. 12, the inner bearing guides 1020 may be formed in a surface of the inner movable bracket portion 1008B, with corresponding inner bearing guides 1020 also formed in a surface of the fixed bracket portion 1002. The bearing elements 1022 may be positioned in the outer bearing guides 1018 and in the inner bearing guides 1022. The bearing elements 1022 may be, for example, ball bearings or roller bearings. In some embodiments, a lubricant (e.g., grease) may also be applied to the outer bearing guides 1018 and inner bearing guides 1020.

The outer movable bracket portion 1008A may be coupled to the inner movable bracket portion 1008B, such as via bolts 1024. Flexible washers 1026 (e.g., O-rings) may be positioned around the bolts 1024, such as to apply a preload (e.g., a compressive force) between the movable bracket portion 1008 and the fixed bracket portion 1002 and to maintain the bearing elements 1022 within the respective bearing guides 1018, 1020. The preload may also provide a stiffness to the lens movement mechanism 700 (e.g., a resistance to off-axis motion of the movable optical lens 1012). As illustrated in FIG. 11, the fixed bracket portion 1002 may include cutouts 1034 through which the bolts 1024 may pass. The cutouts 1034 may be larger than the bolts 1024 and the flexible washers 1026, such that the bolts 1024 and flexible washers 1026 may move back and forth within the cutouts 1034.

An actuator 1028 (e.g., a VCA, linear actuator, brushless DC motor, stepper motor, piezoelectric actuator, etc.) may be positioned and configured to move the movable bracket portion 1008 and movable optical lens 1012 relative to the fixed bracket portion 1002 and to the frame 1006 of the HMD system. For example, a base 1030 of the actuator 1028 may be coupled to the frame 1006 and an output shaft 1032 of the actuator 1028 may be coupled to the movable bracket portion 1008. Alternatively, the base 1030 of the actuator 1028 may be coupled to the movable bracket portion 1008 and the output shaft 1032 of the actuator 1028 may be coupled to the frame 1006. The movable bracket portion 1008 may be configured to translate (e.g., slide, roll, etc.) in a desired direction (e.g., substantially along an optical axis 1016 of the movable optical lens 1012) to move the movable optical lens 1012 relative to the frame 1006 of the HMD system. The bearing elements 1022 and corresponding bearing guides 1018, 1020 may guide (e.g., constrain) the movement of the movable optical lens 1012 in the desired direction.

Figure 13:
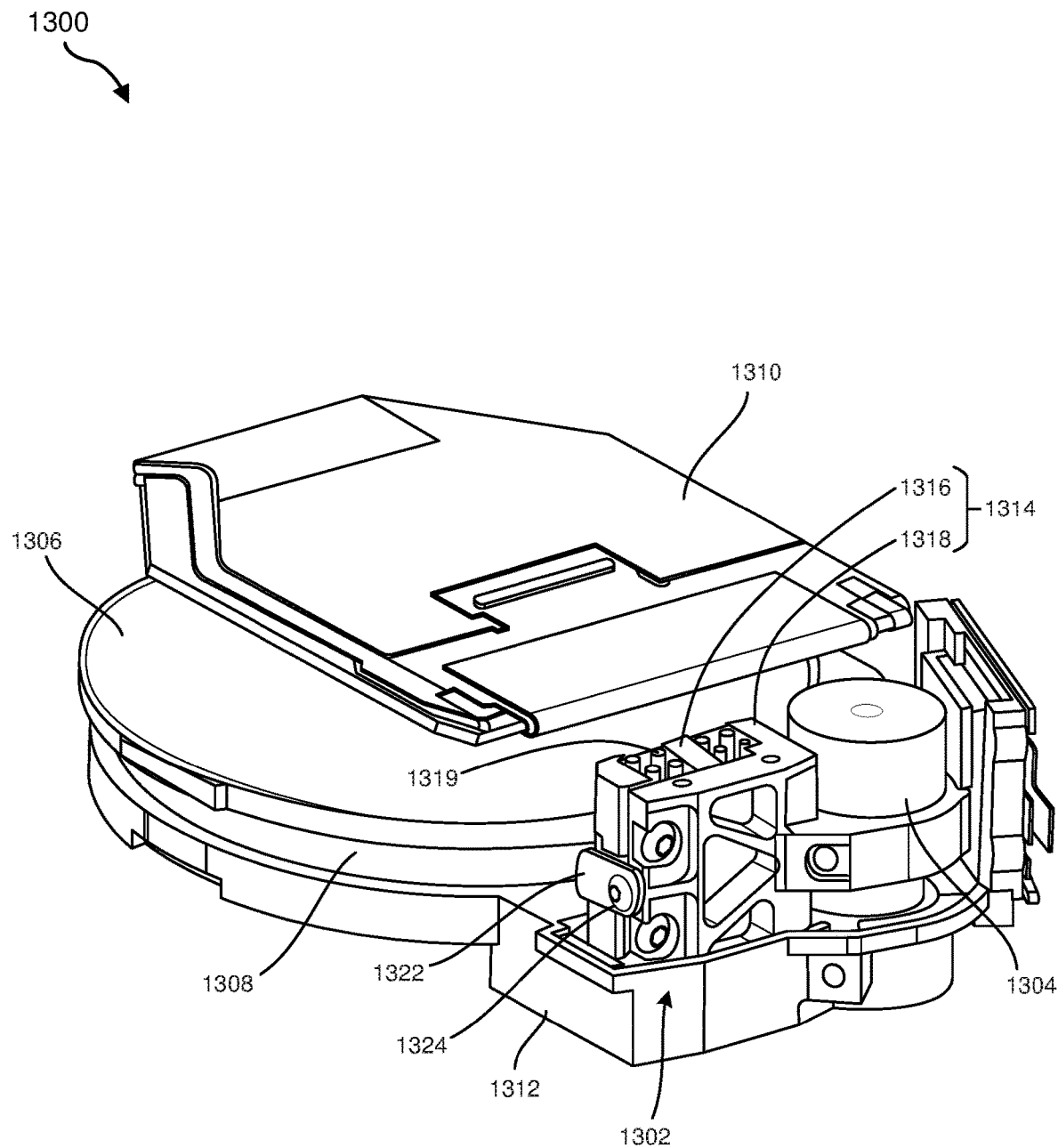
FIG. 13 is a perspective view of a lens movement mechanism, according to at least one additional embodiment of the present disclosure.
Figure 14:
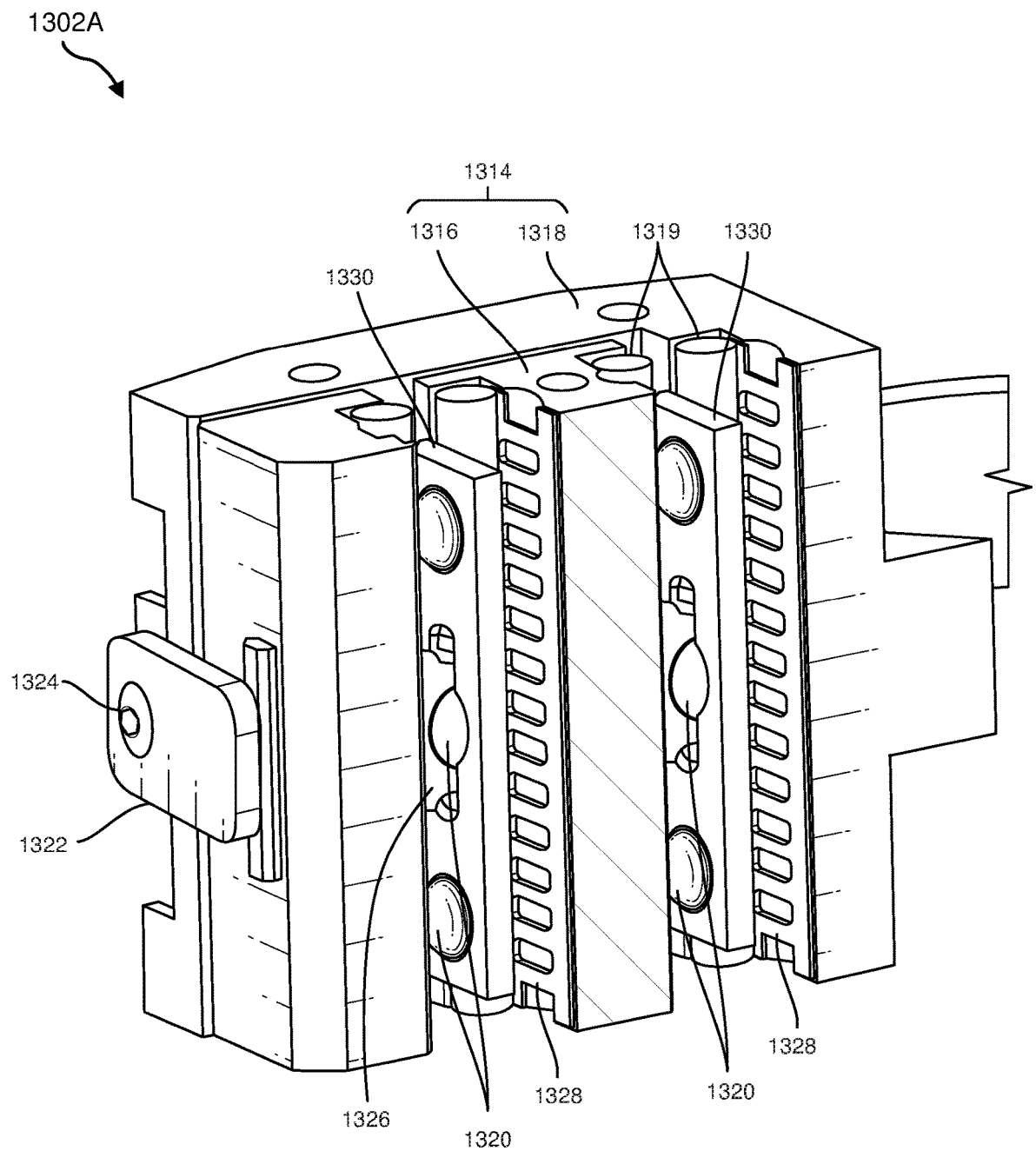
FIG. 14 is a perspective view of one example configuration of a bearing assembly of the lens movement mechanism of FIG. 13.
Figure 15:
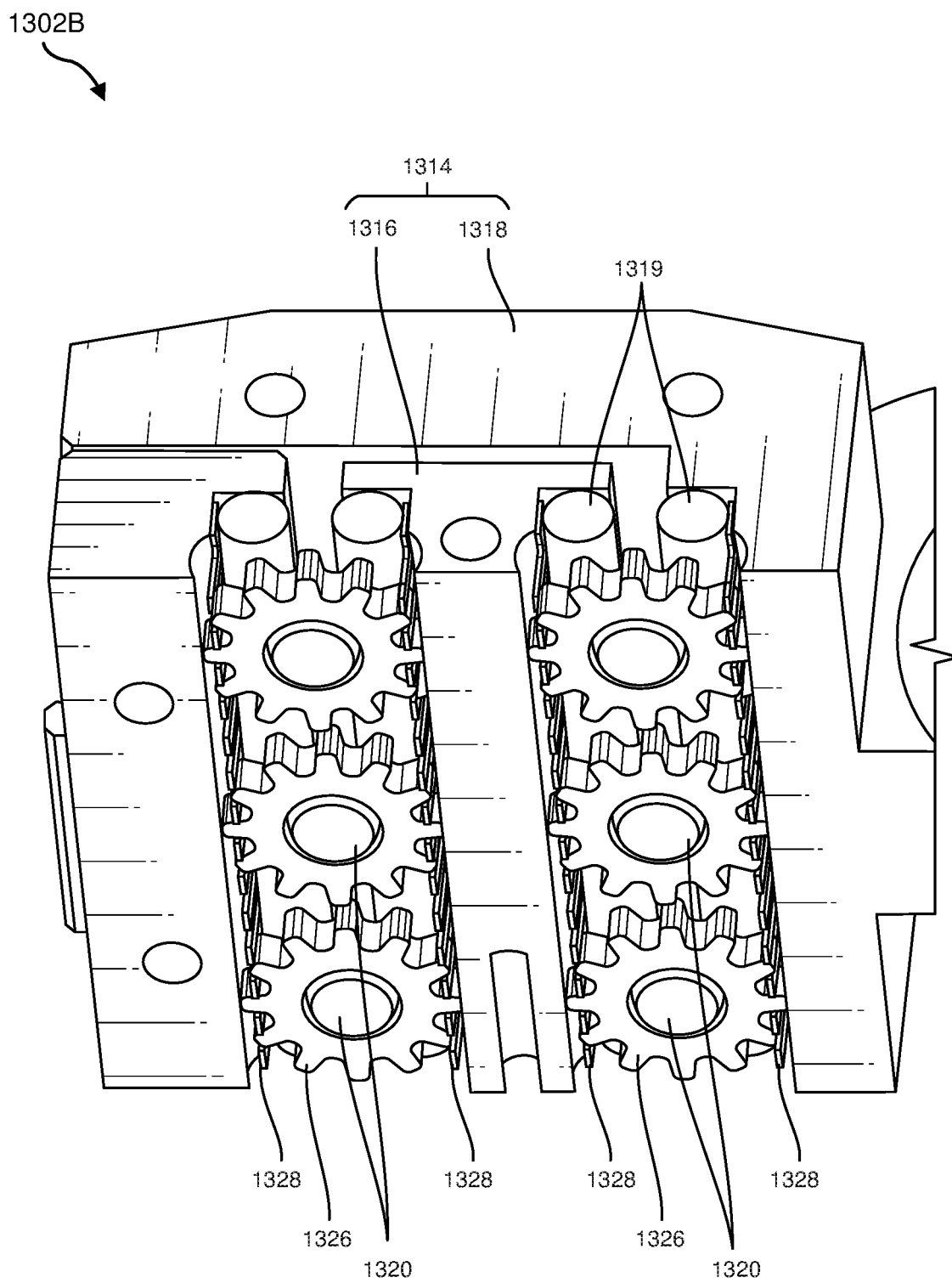
FIG. 15 is a cross-sectional view of another example configuration of a bearing assembly of the lens movement mechanism of FIG. 13.

FIG. 13 is a perspective view of a lens movement mechanism 1300 that includes a bearing assembly 1302. FIG. 14 is a perspective view of one example configuration of the bearing assembly 1302A and FIG. 15 is a cross-sectional view of another example configuration of the bearing assembly 1302B. As shown in FIG. 13, the lens movement mechanism 1300 may include an actuator 1304 (e.g., a VCA, linear actuator, brushless DC motor, stepper motor, piezoelectric actuator, etc.) positioned and configured to move a movable optical lens 1306 in a desired direction (e.g., along an optical axis of the movable optical lens 1306). The bearing assembly 1302 may be configured to guide movement of the movable optical lens 1306 relative to a fixed optical lens 1308, an electronic display 1310, and a frame 1312 of an HMD system supporting the fixed optical lens 1308 and the electronic display 1310. The bearing assembly 1302 may include a bracket assembly 1314 including a fixed bracket portion 1316 coupled to the frame 1312 and a movable bracket portion 1318 coupled to the movable optical lens 1306. Bearing elements 1320 (shown in FIGS. 14 and 15) may be positioned between the fixed bracket portion 1316 and the movable bracket portion 1318. The bearing elements 1320 may be configured to roll and/or slide between the fixed bracket portion 1316 and the movable bracket portion 1318. Bearing guides 1319 (e.g., pins, rods, etc.) may also be positioned between the fixed bracket portion 1316 and the movable bracket portion 1318, and the bearing elements 1320 may be configured to roll and/or slide against the bearing guides 1319. The movable bracket portion 1318 and the movable optical lens 1306 may be configured to move along the fixed bracket portion 1316 upon activation of the actuator 1304.

As shown in FIGS. 13 and 14, a preload may be applied to the bearing elements 1320 by a preload tab 1322 and corresponding bolt 1324. For example, a portion of the movable bracket portion 1318 may be held in place relative to the remainder of the movable bracket portion 1318 by the preload tab 1322, and the bolt 1324 may be tightened until a predetermined preload is applied to the bearing elements 1320. By way of additional examples, a preload may be applied to the bearing elements 1320 via angled fasteners, metal coil and sheet springs, spring pins, elastomeric springs or bands, fixture elements including a transducer (e.g., a load cell) and a micrometer positioning stage (e.g., a movable stage configured to position a load cell to apply a preload force to the bearing elements 1320), and/or set screws, etc.

As illustrated in FIGS. 14 and 15, one or more of the bearing elements 1320 may, in some embodiments, include a toothed gear 1326. In the example shown in FIG. 14, a center one of the bearing elements 1320 may include a toothed gear 1326. In the example shown in FIG. 15, each of the bearing elements 1320 may include a toothed gear 1326. A complementary rack 1328 may be coupled to the fixed bracket portion 1316 and/or to the movable bracket portion 1318. When the movable bracket portion 1318 moves along the fixed bracket portion 1316, the gears of the bearing elements 1320 may be engaged with and roll along the rack(s) 1326. Configurations with toothed gears 1326 and complementary racks 1328 may reduce creep in the bearing elements 1320 and improve the function and/or life of the lens movement mechanism 1300 compared to some other bearing element types by preventing bearing creep. For example, the toothed gears 1326 and racks 1328 may cause the bearing elements 1320 to maintain their relative position between the fixed bearing guide and the moving bearing guide. Without the toothed gears 1326 and racks 1328, the bearing elements 1320 may exhibit creep (e.g., the bearing elements 1320 slipping and migrating toward one end of the guideway) due to unbalanced forces from friction, preload, inertia, gravity, etc. As the bearing elements 1320 move further from their initial position, the bearing elements 1320 may prematurely contact end stops, which may result in the mechanism jamming. Consequently, travel of the mechanism may be reduced and/or friction may significantly increase as the bearing elements 1320 are dragged by one bearing guide and forced to slide on the other until both end stops are contacted.

As illustrated in FIG. 14, in some embodiments the bearing assembly 1302A may include a bearing cage 1330 that may be configured to maintain the bearing elements 1320 at a predetermined distance from each other, such as to keep the bearing elements 1320 from creeping relative to one another. This may prevent the bearing elements 1320 from contacting one another, which would otherwise increase friction and/or wear.

Although FIGS. 14 and 15 illustrate three bearing elements 1320 in each set of bearing elements 1320, the present disclosure is not so limited. For example, the bearing assembly 1302 may include one or more sets of bearing elements 1320 that each include two, three, four, five, or more bearing elements 1320.

Figure 16:
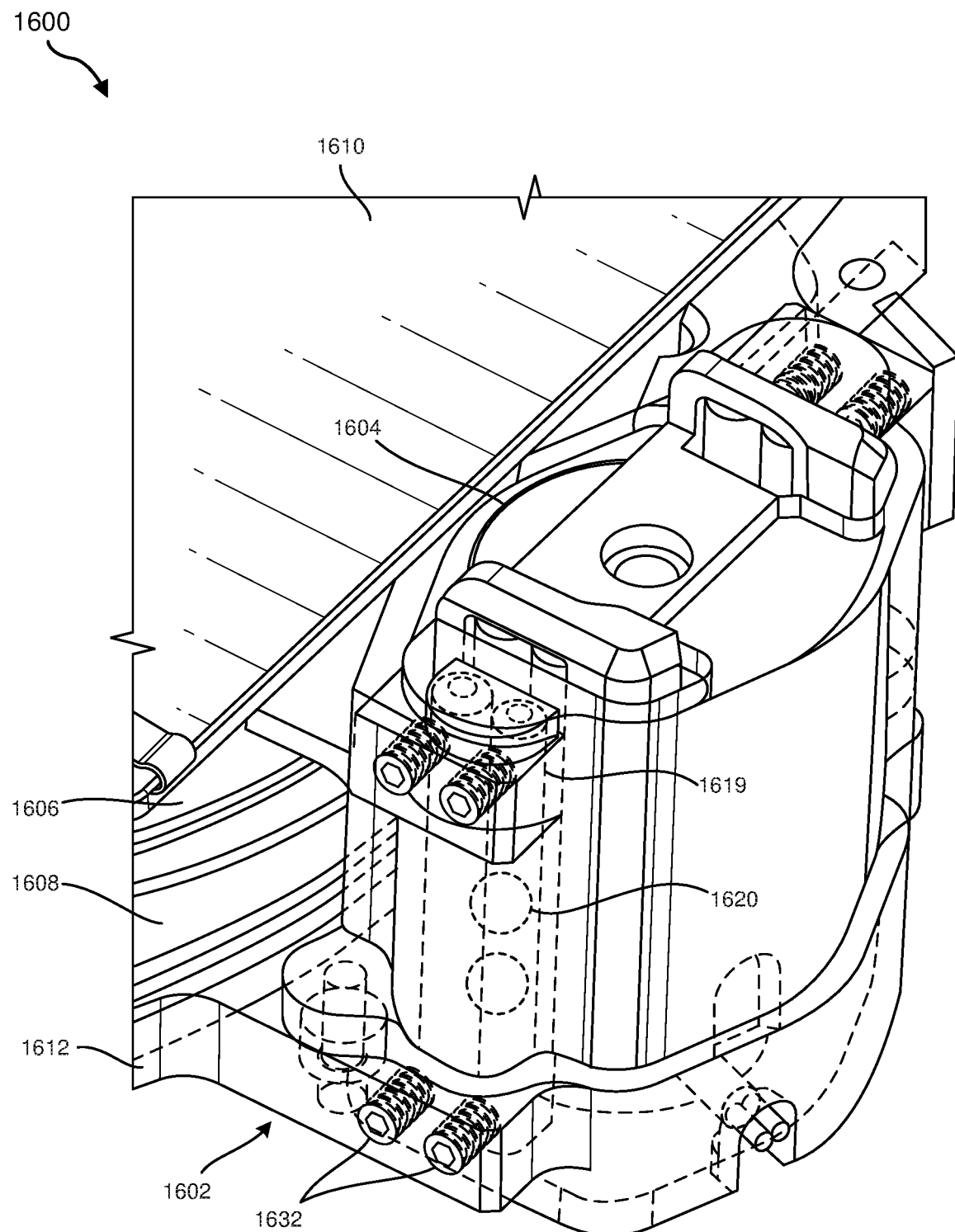
FIG. 16 is a detailed perspective view of a lens movement mechanism, according to at least one additional embodiment of the present disclosure.

FIG. 16 is a detailed perspective view of a lens movement mechanism 1600, according to at least one additional embodiment of the present disclosure. The lens movement mechanism 1600 may be similar to the lens movement mechanism 1300 described above in some respects. For example, the lens movement mechanism 1600 may include a bearing assembly 1602 and an actuator 1604 positioned and configured to move a movable optical lens 1606 in a desired direction. The bearing assembly 1602 may be configured to move the movable optical lens 1606 relative to a fixed optical lens 1608, an electronic display 1610, and a frame 1612 of an HMD system. Bearing elements 1620 (two of which are shown in FIG. 16 in dashed lines) may be positioned to roll and/or slide between relatively movable portions of the bearing assembly 1602, such as bearing guides 1619.

As illustrated in FIG. 16, the bearing assembly 1602 may be positioned to at least partially surround the actuator 1604. For example, a first bearing set may be positioned on one side of the actuator 1604 and a second bearing set may be positioned on an opposite side of the actuator 1604. Set screws 1632 may be positioned to apply a preload to the bearing elements 1620, such as by applying a pressure to the bearing guides 1619.

Figure 17:
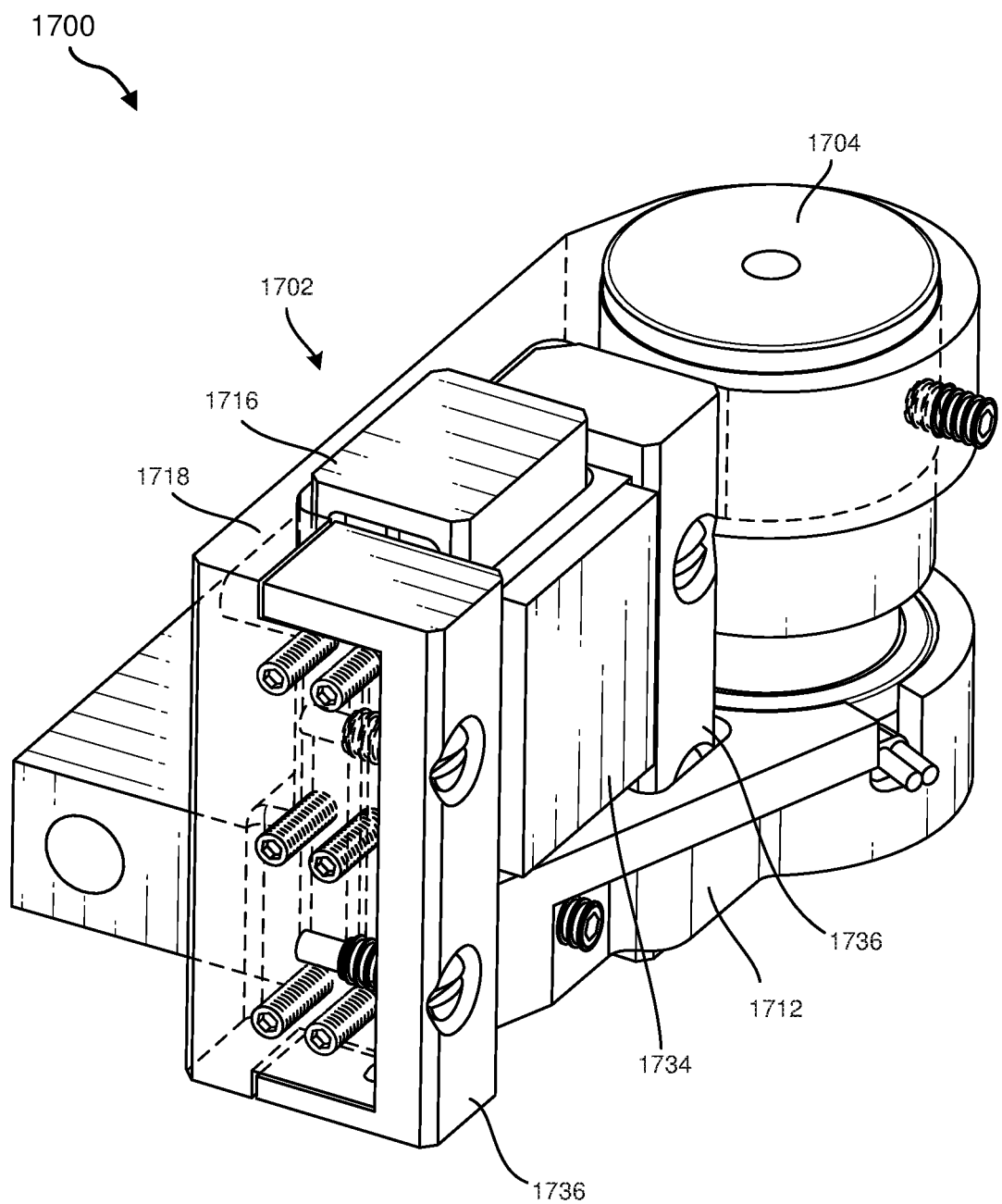
FIG. 17 is a partially cut-away perspective view of a lens movement mechanism, according to at least one further embodiment of the present disclosure.

FIG. 17 is a partially cut-away perspective view of a lens movement mechanism 1700, according to at least one further embodiment of the present disclosure. The lens movement mechanism 1700 may be similar to the lens movement mechanism 1300 described above in some respects. For example, the lens movement mechanism 1700 may include a bearing assembly 1702 and an actuator 1704 positioned and configured to move a movable optical lens in a desired direction. The bearing assembly 1702 may be configured to move the movable optical lens relative to a fixed optical lens, an electronic display, and a frame 1712 of an HMD system. The bearing assembly 1702 may include a fixed bracket portion 1716 and a movable bracket portion 1718. Bearing elements may be positioned to roll and/or slide between the fixed bracket portion 1716 and the movable bracket portion 1718.

As shown in FIG. 17, set screws 1732 may be positioned to apply a preload to the bearing elements of the bearing assembly 1702, such as by applying a pressure to bearing guides. A sensor element 1734 (e.g., a permanent magnet) may be mounted to the movable bracket portion 1718 to facilitate determining a position of the movable bracket portion 1718 relative to the frame 1712. One or more assembly plates 1736 may be positioned along a lateral side (from the perspective of FIG. 17) of the bearing assembly 1702 to hold the components of the bearing assembly 1702 in place.

Figure 18:
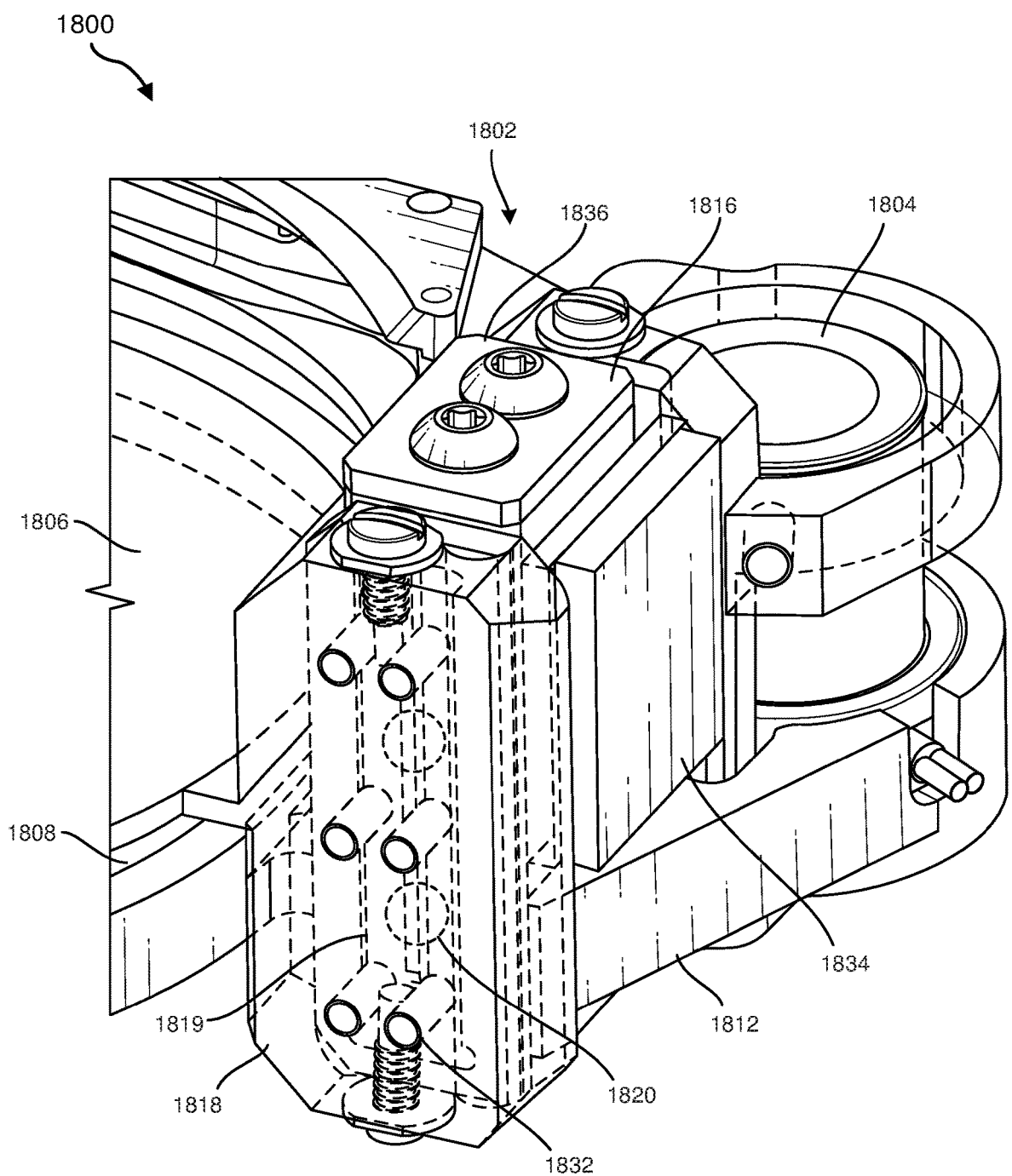
FIG. 18 is a detailed perspective view of a lens movement mechanism, according to at least one other embodiment of the present disclosure.

FIG. 18 is a detailed perspective view of a lens movement mechanism 1800, according to at least one other embodiment of the present disclosure. The lens movement mechanism 1800 may be similar to the lens movement mechanism 1300 described above in some respects. For example, the lens movement mechanism 1800 may include a bearing assembly 1802 and an actuator 1804 positioned and configured to move a movable optical lens 1806 in a desired direction. The bearing assembly 1802 may be configured to move the movable optical lens 1806 relative to a fixed optical lens 1808, an electronic display, and a frame 1812 of an HMD system. The bearing assembly 1802 may include a fixed bracket portion 1816 and a movable bracket portion 1818. Bearing elements 1820 may be positioned to roll and/or slide between the fixed bracket portion 1816 and the movable bracket portion 1818.

As shown in FIG. 18, set screws 1832 may be positioned to apply a preload to the bearing elements 1820 of the bearing assembly 1802, such as by applying a pressure to bearing guides 1819. A sensor element 1834 (e.g., a permanent magnet) may be mounted to the movable bracket portion 1818 to facilitate determining a position of the movable bracket portion 1818 relative to the frame 1812. One or more assembly plates 1836 may be positioned at a top side (from the perspective of FIG. 18) of the bearing assembly 1802 to hold the components of the bearing assembly 1802 in place.

Figure 19:
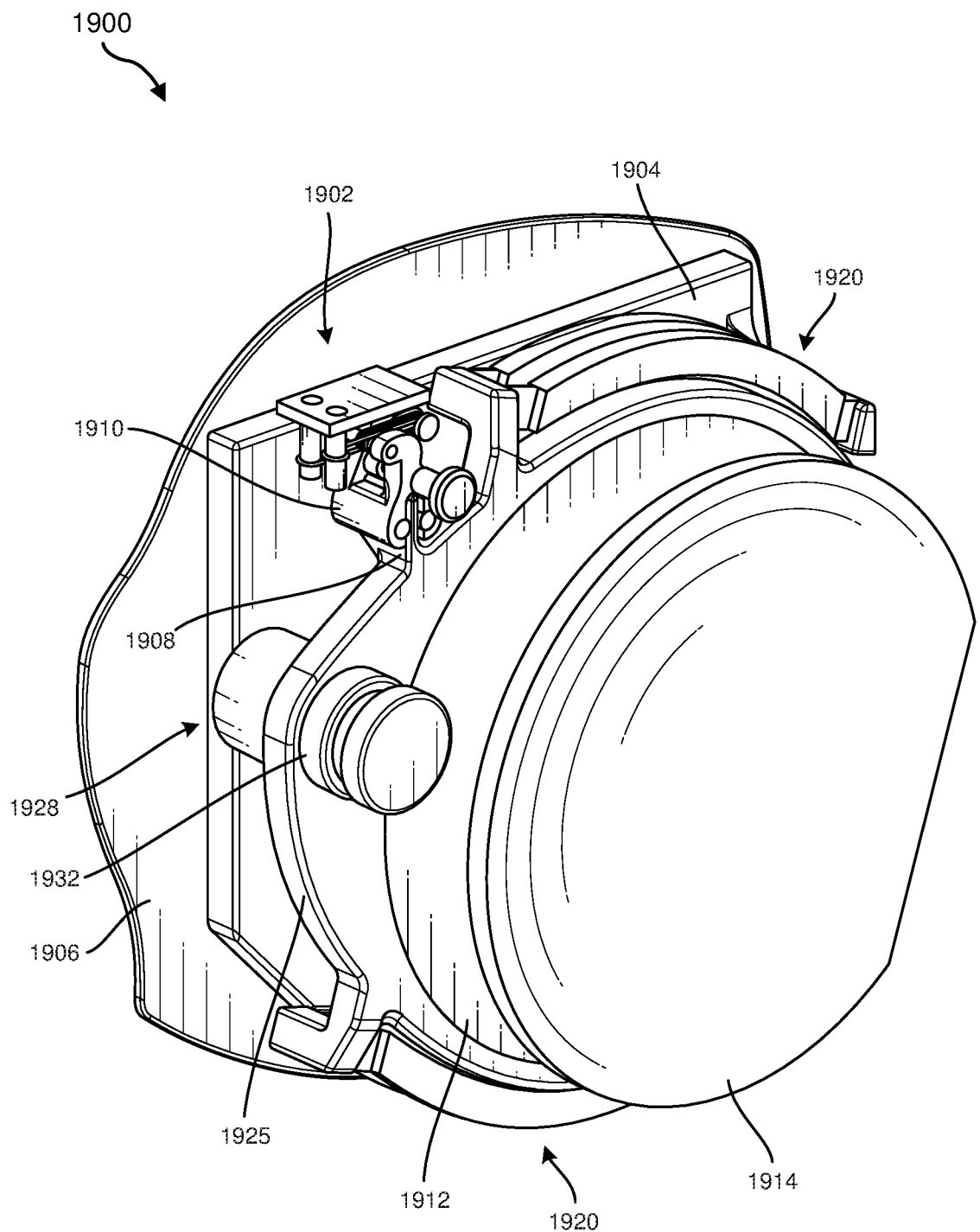
FIG. 19 is a partially cut-away perspective view of a lens movement mechanism including a lens movement stop mechanism, according to at least one embodiment of the present disclosure.
Figure 20:
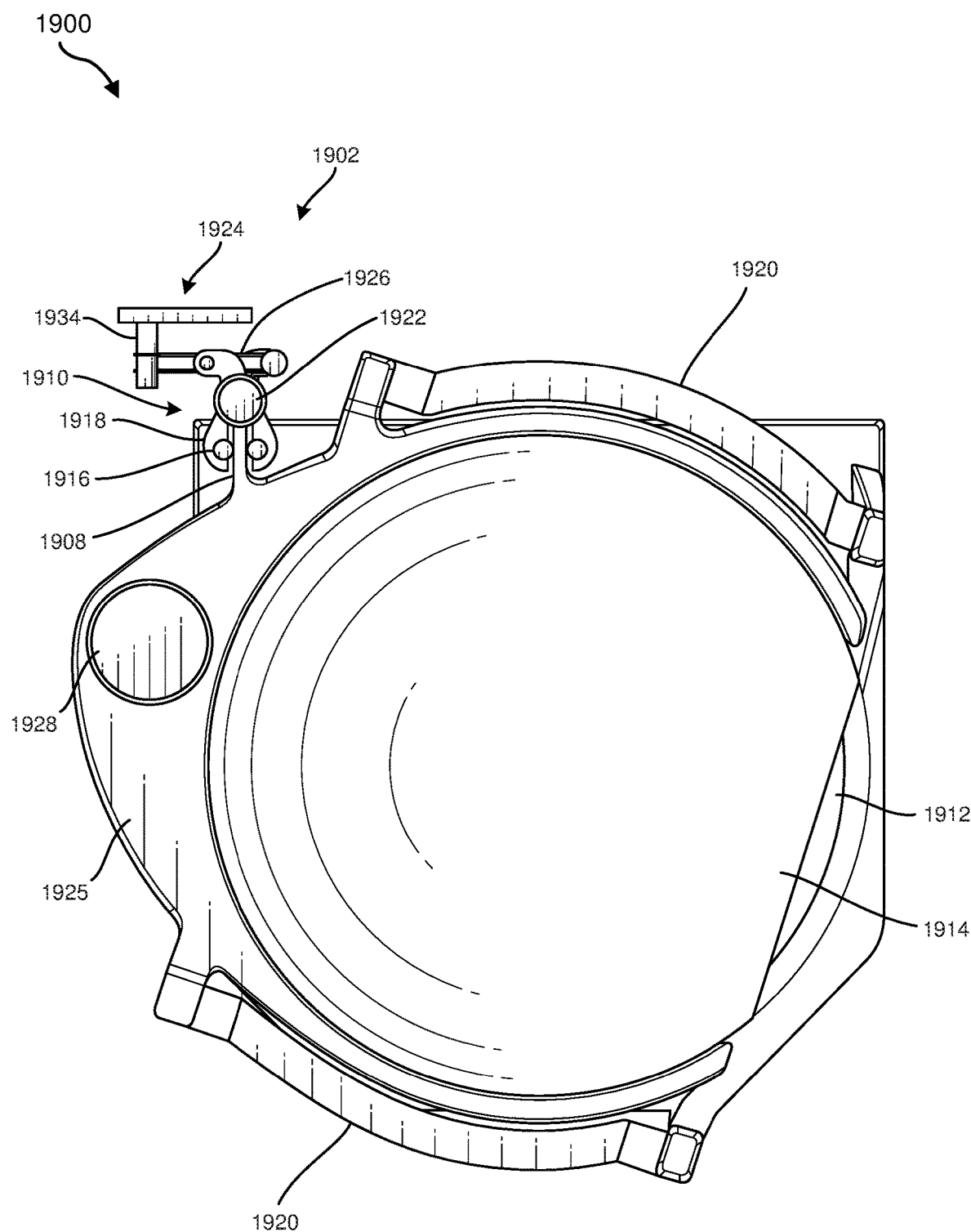
FIG. 20 is front view of the lens movement mechanism and the lens movement stop mechanism of FIG. 19.
Figure 21:
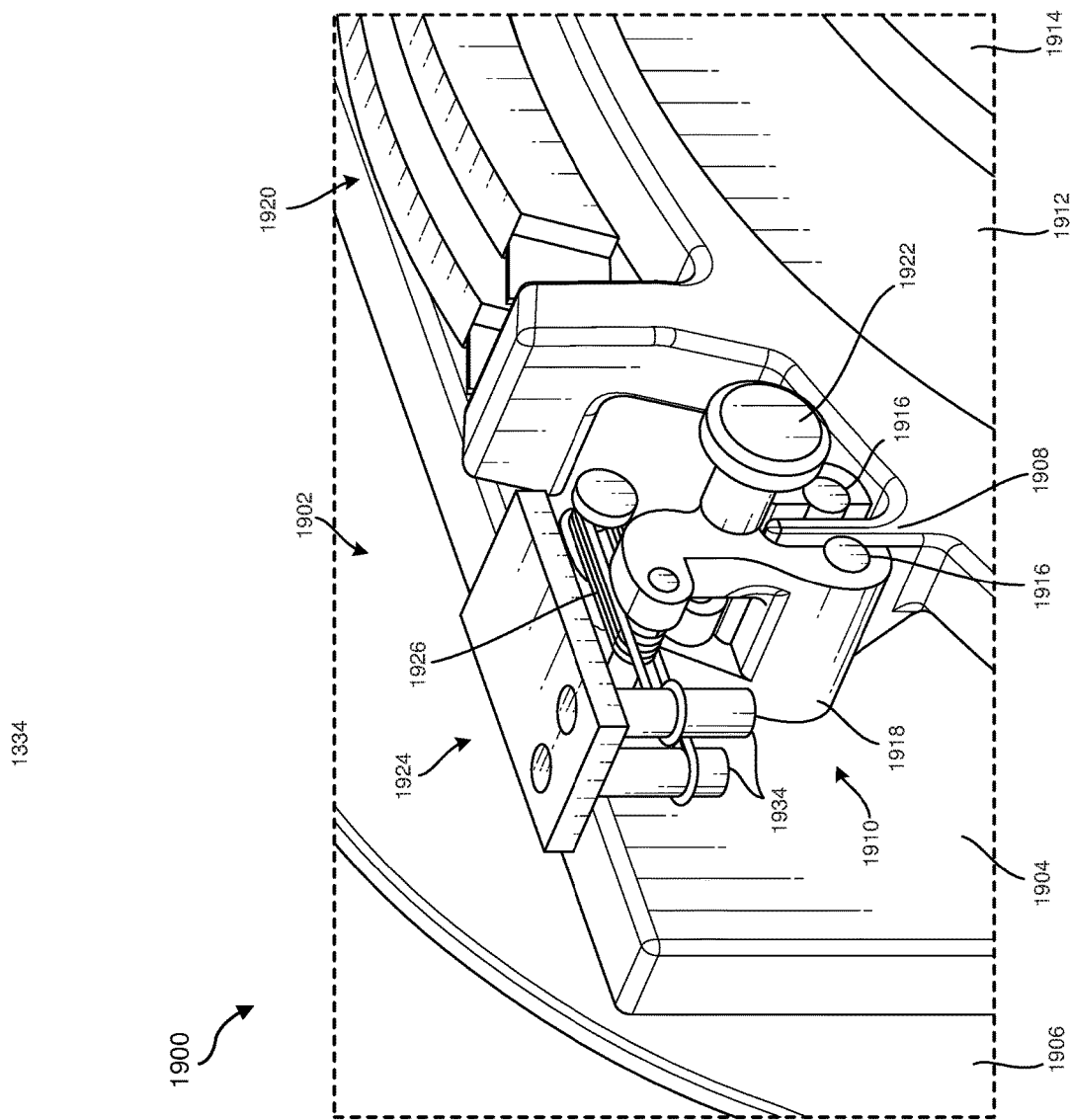
FIG. 21 is a detailed perspective view of the lens movement stop mechanism of FIG. 19.
Figure 22:
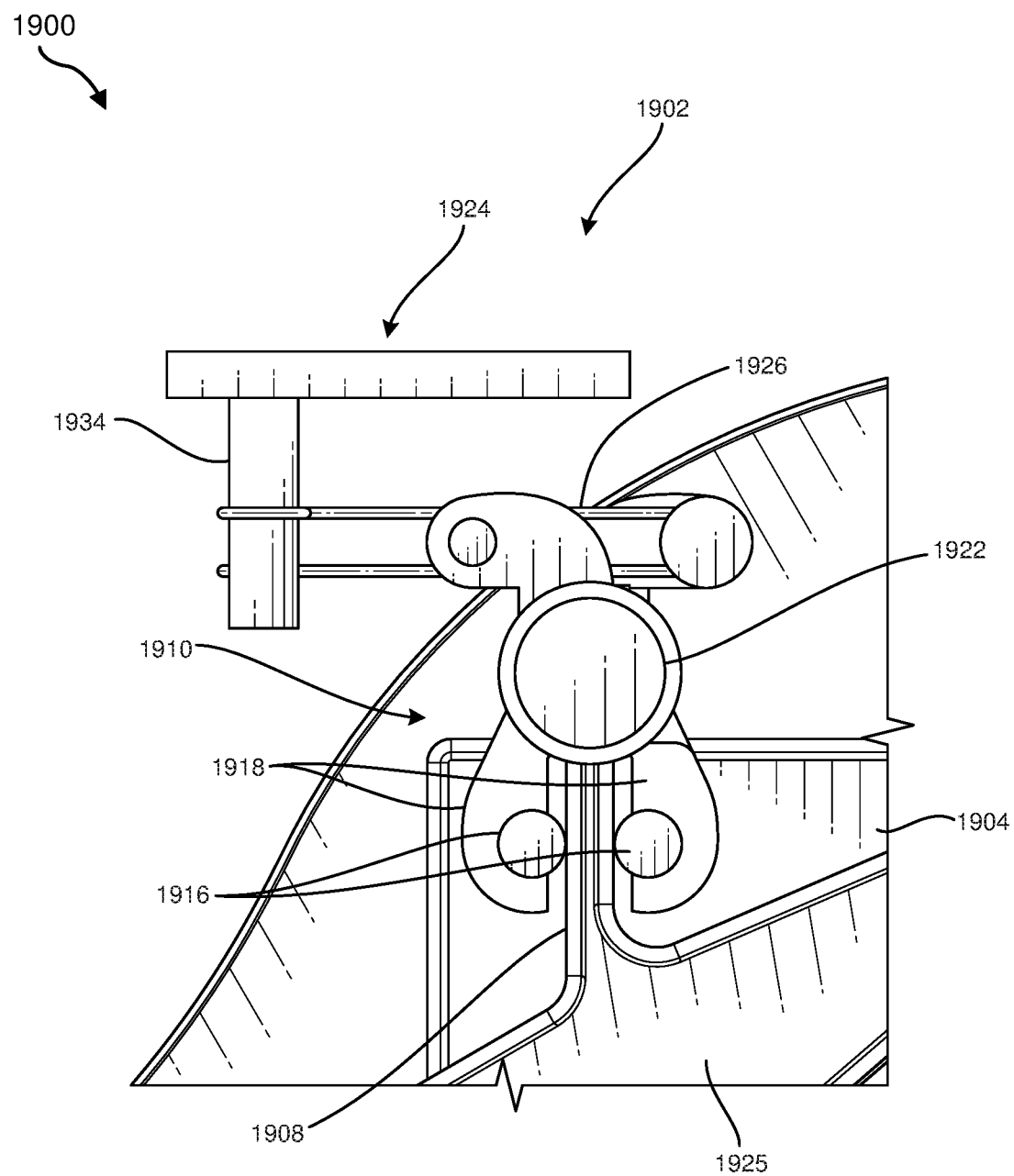
FIG. 22 is a detailed front view of the lens movement stop mechanism of FIG. 19.
Figure 23:
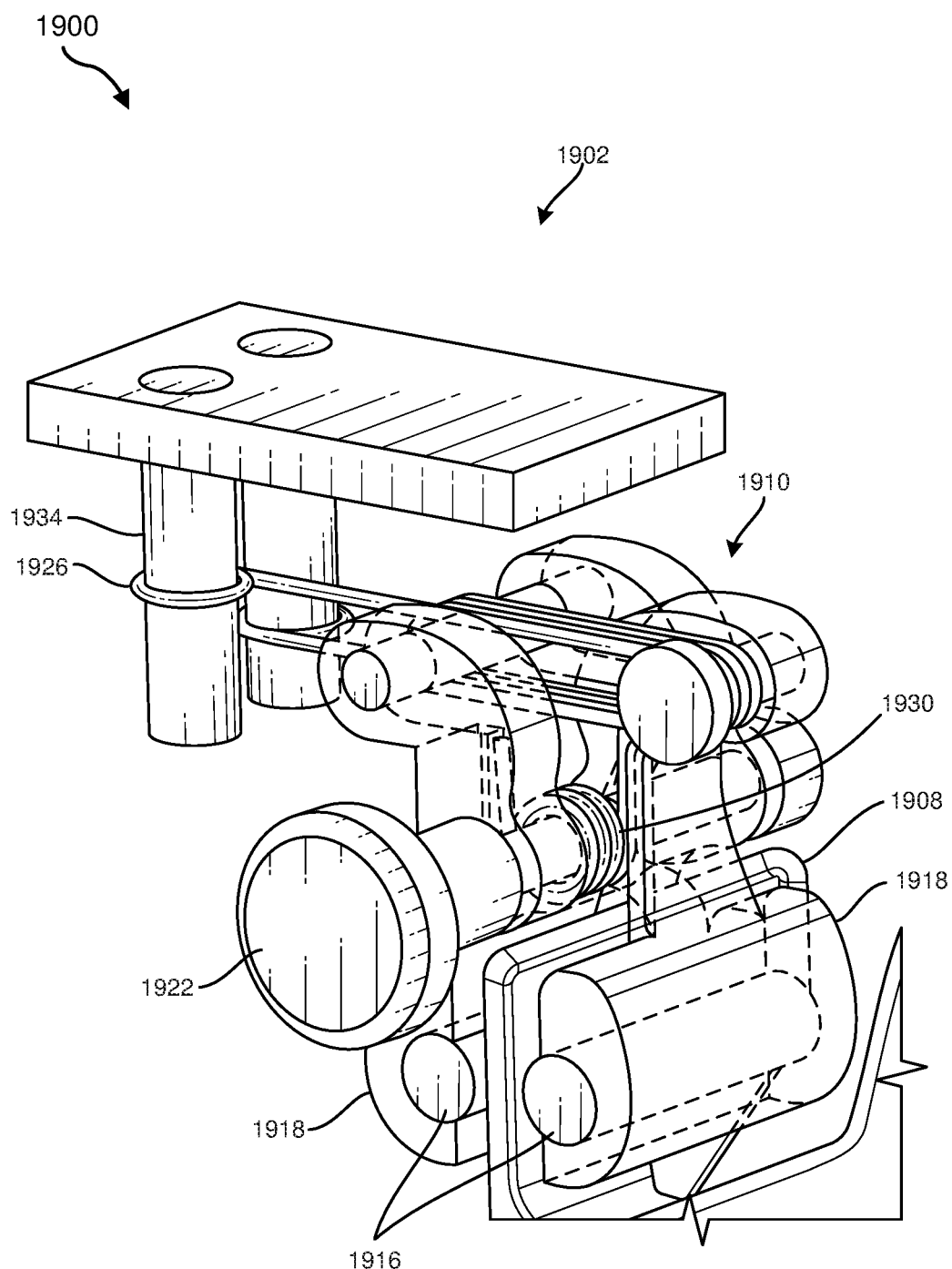
FIG. 23 is another detailed perspective view of the lens movement stop mechanism of FIG. 19.

FIG. 19 is a partially cut-away perspective view of a lens movement mechanism 1900 including a lens movement stop mechanism 1902 (e.g., a brake mechanism), according to at least one embodiment of the present disclosure. FIG. 20 is a front view of the lens movement mechanism 1900 and the lens movement stop mechanism 1902 of FIG. 19. FIG. 21 is a detailed perspective view of the lens movement stop mechanism 1902 of FIG. 19. FIG. 22 is a detailed front view of the lens movement stop mechanism 1902 of FIG. 19. FIG. 23 is another detailed perspective view of the lens movement stop mechanism 1902 of FIG. 19. As shown in FIGS. 19-23, the lens movement mechanism 1900 may include a flexure assembly 1920, a bracket 1925 coupling the flexure assembly 1920 to a movable optical lens 1912, and an actuator 1928 (e.g., a VCA, linear actuator, brushless DC motor, stepper motor, piezoelectric actuator, etc.) positioned and configured to move the bracket 1925 and the movable optical lens 1912 in a desired direction. The movable optical lens 1912 may be movable relative to an electronic display 1904, a frame 1906 of a corresponding HMD system, and a fixed optical lens 1914. Some types of actuators 1928 for moving the movable optical lens 1912, such as VCAs, may not inherently stop movement of the movable optical lens 1912 when the actuator 1928 is powered down. For example, an output shaft 1932 of the actuator 1928 may substantially freely axially move when the actuator 1928 is powered down. In embodiments of the present disclosure, this may result in the movable optical lens 1912 substantially freely moving, such as due to gravity, inertia from head-movement, or other forces.

Thus, in some examples, the lens movement mechanism 1900 may include the lens movement stop mechanism 1902, which may include a protrusion 1908 (e.g., a fin) extending from the bracket 1925 and a clamp 1910 positioned and configured to abut against the protrusion 1908 to stop movement of the bracket 1925 and movable optical lens 1912. For example, the clamp 1910 may include a brake element 1916 (e.g., a polymer material such as an O-ring material, an elastomer, or another brake material) positioned to abut against the protrusion 1908 when the lens movement stop mechanism 1902 is actuated. In some embodiments, the protrusion 1908 may include one or more slots or holes and the brake element 1916 may include one or more corresponding pins or bumps. Clamp arms 1918 of the clamp 1910 may rotate about a pivot pin 1922. In some embodiments, the pivot pin 1922 may define a common axis of rotation of the clamp arms 1918. This axis of rotation may, in some examples, be substantially parallel to an optical axis of the movable optical lens 1912. Ends of the clamp arms 1918 opposite the brake element 1916 may be operably coupled to a brake actuator 1924. Upon activation of the brake actuator 1924, the clamp arms 1918 may be rotated and the brake element 1916 may abut against the protrusion 1908 of the bracket 1925 to stop movement of the bracket 1925 and movable optical lens 1912.

Although the lens movement stop mechanism 1902 of FIGS. 19-23 is illustrated with the clamp 1910, the present disclosure is not so limited. For example, other brake mechanism types may be employed, such as spring-biased pins, linear actuators, leadscrew actuators, etc.

In some examples, the brake actuator 1924 used to activate the lens movement stop mechanism 1902 may include a wire 1926 that may be or include a shape-memory alloy ("SMA"), such as nitinol. As shown in FIGS. 19-23, the SMA wire 1926 may be wrapped around the clamp arms 1918 such that when the SMA wire 1926 is lengthened (e.g., upon removal of an applied heat and/or electrical current in the SMA wire 1926), a spring element 1930 (e.g., a torsion spring) (illustrated in FIG. 7) may bias the clamp arms 1918 to apply a sufficient pressure on the protrusion 1908 with the brake elements 1916 to inhibit (e.g., reduce or eliminate) movement of the bracket 1925 and, consequently, of the movable optical lens 1912. When the SMA wire 1926 is constricted (e.g., upon application sufficient heat and/or electrical current in the SMA wire 1926), the clamp arms 1918 may overcome a force applied by the spring element 1930 to release sufficient pressure on the brake elements 1916 to allow the bracket 1925 and movable optical lens 1912 to move in a desired direction.

In some examples, heat (e.g., resistive heat) may be applied to the SMA wire 1926 by application of a sufficient voltage to electrodes 1934 coupled to ends of the SMA wire 1926. In additional examples, waste heat from electrical circuitry used to operate a corresponding HMD may be used to heat the SMA wire 1926. In any case, a powered-down state of the HMD may result in the lens movement stop mechanism 1902 stopping movement of the movable optical lens 1912.

Although the lens movement stop mechanism 1902 is shown in FIGS. 19-23 as including an SMA wire 1926 as part of the brake actuator 1924, other types of actuators (e.g., stepper motors, linear actuators, etc.) are also options for the brake actuator 1924.

Figure 24:
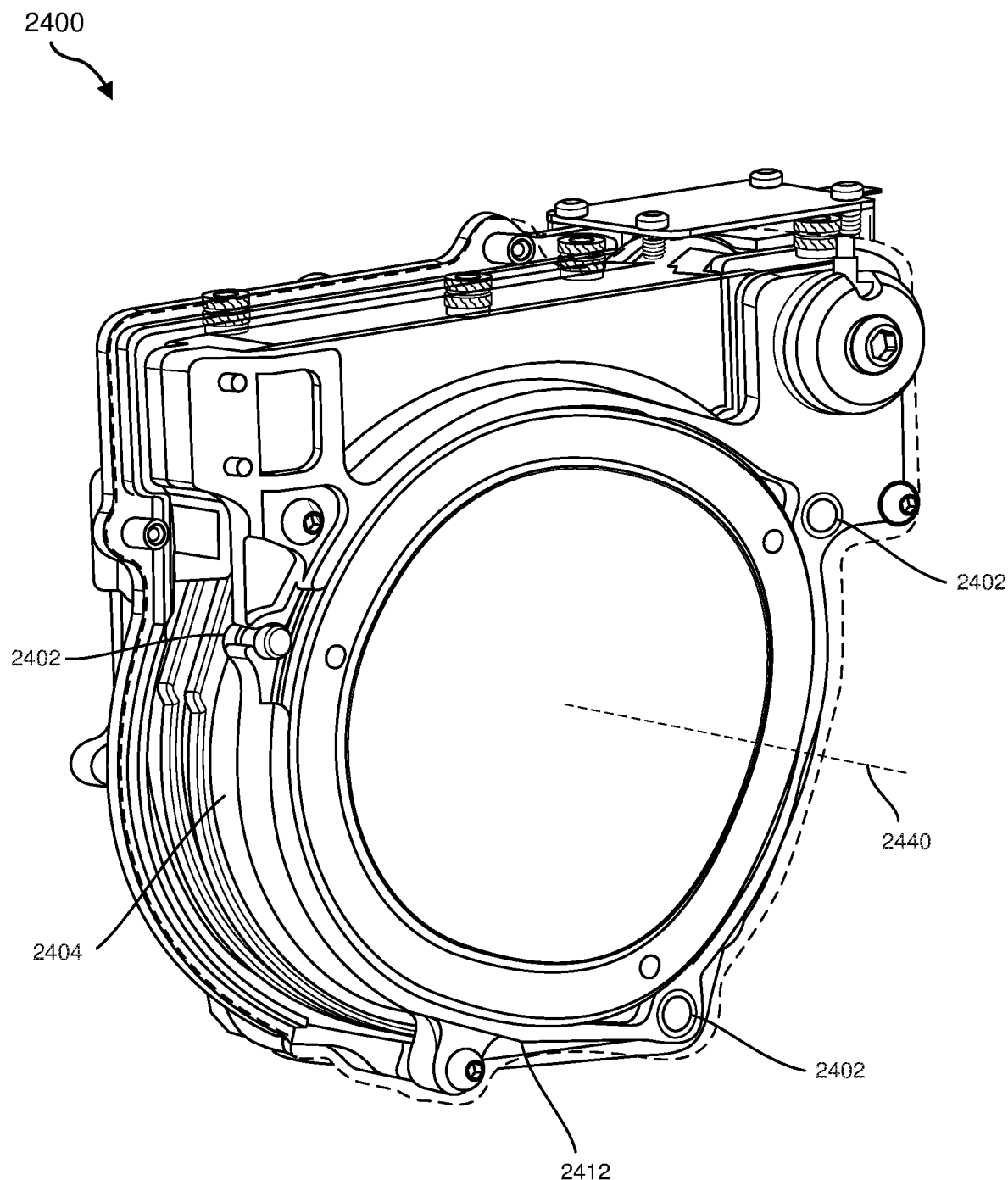
FIG. 24 is a perspective view of an optical assembly including shock protection elements, according to at least one additional embodiment of the present disclosure.
Figure 25:
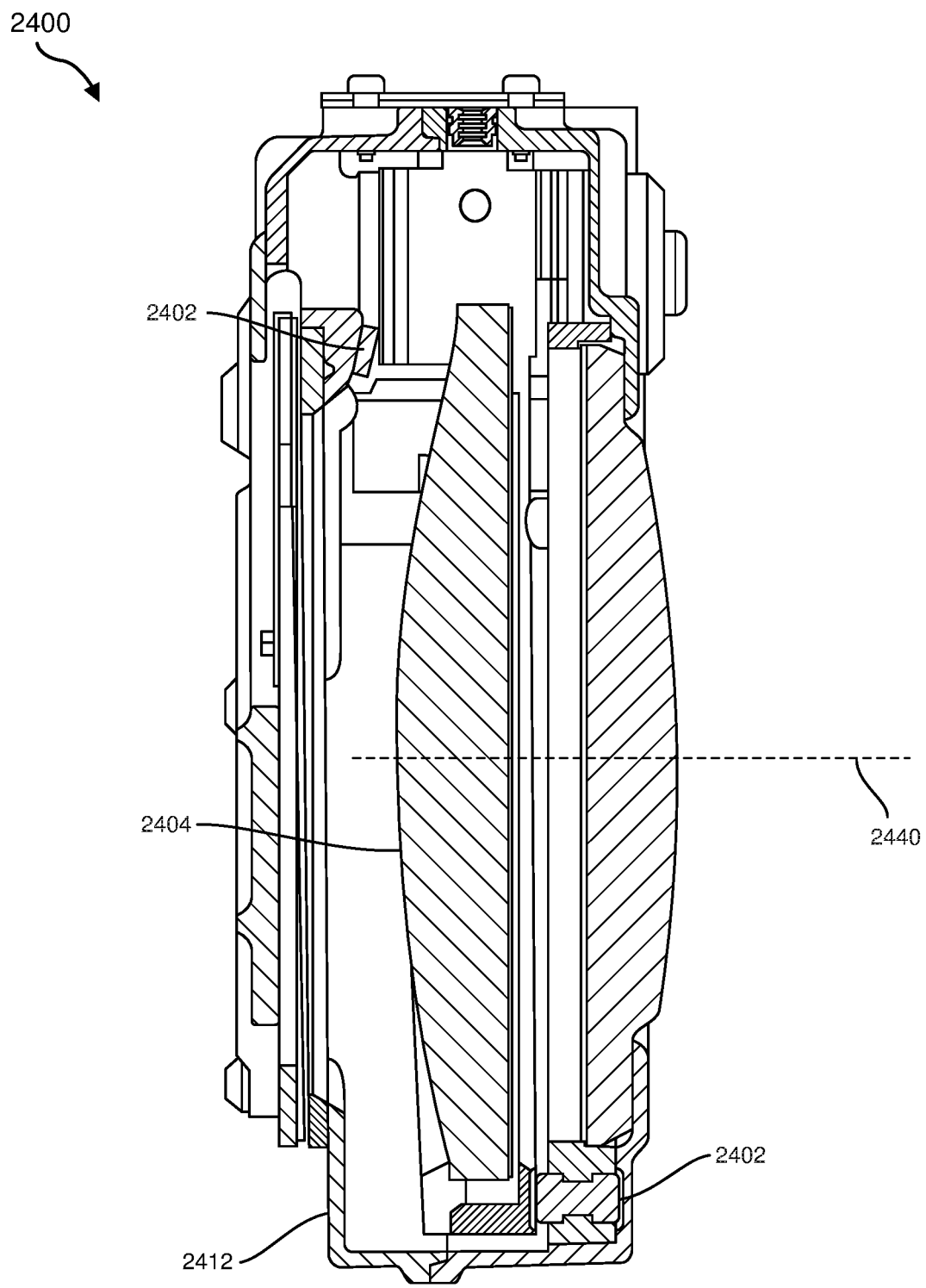
FIG. 25 is a cross-sectional view of the optical assembly of FIG. 24.

FIG. 24 is a perspective view of an optical assembly 2400 including shock protection elements 2402. FIG. 25 is a cross-sectional view of the optical assembly of FIG. 24. The shock protection elements 2402 may include a shock-absorbing material (e.g., an elastomeric material, a foam material, etc.). The shock protection elements 2402 may be positioned and configured to absorb a shock event, such as dropping, striking, or otherwise quickly moving the optical assembly 2400, to reduce a shock felt by a movable optical lens 2404 of the optical assembly 2400. For example, the shock protection elements 2402 may be positioned at one or more locations on a frame 2412 of the optical assembly 2400 such that the movable optical lens 2404 may contact the shock protection elements 2402 if the movable optical lens 2404 is forced to a maximum forward or backward position (e.g., forward or backward relative to an optical axis 2440 of the movable optical lens 2404). The reduced shock may reduce potential damage to the movable optical lens 2404. The reduced shock may also improve a positional accuracy (e.g., alignment, etc.) of the movable optical lens 2404.

Figure 26B:
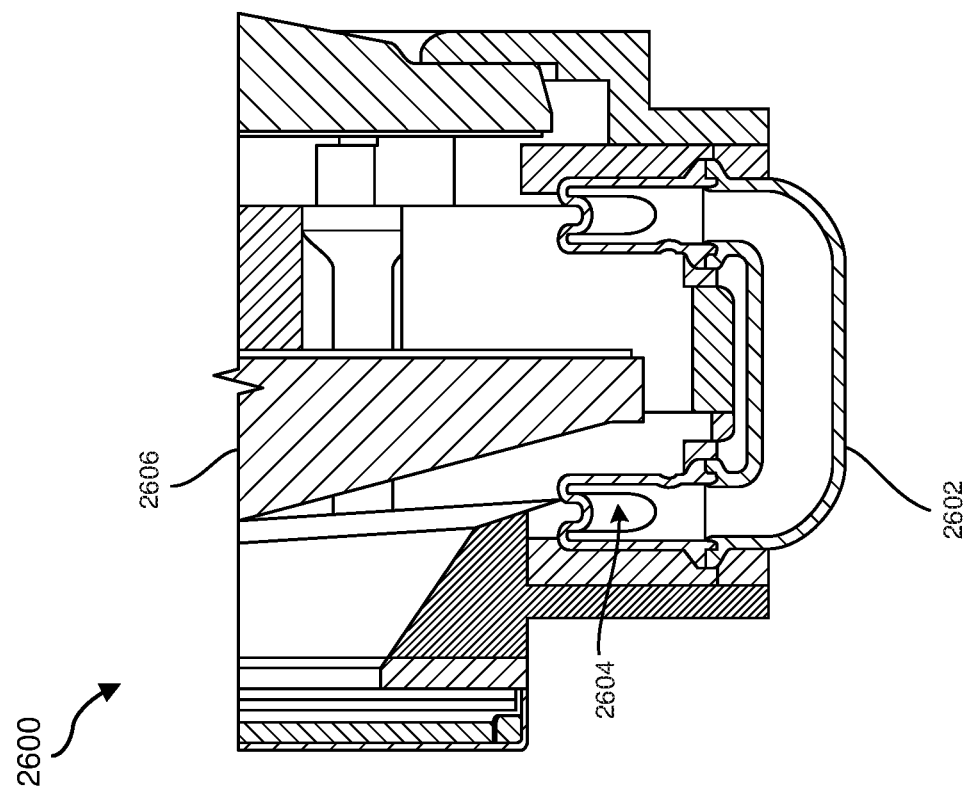
FIG. 26B is a partial cross-sectional view of the optical assembly of FIG. 26A.
Figure 26A:
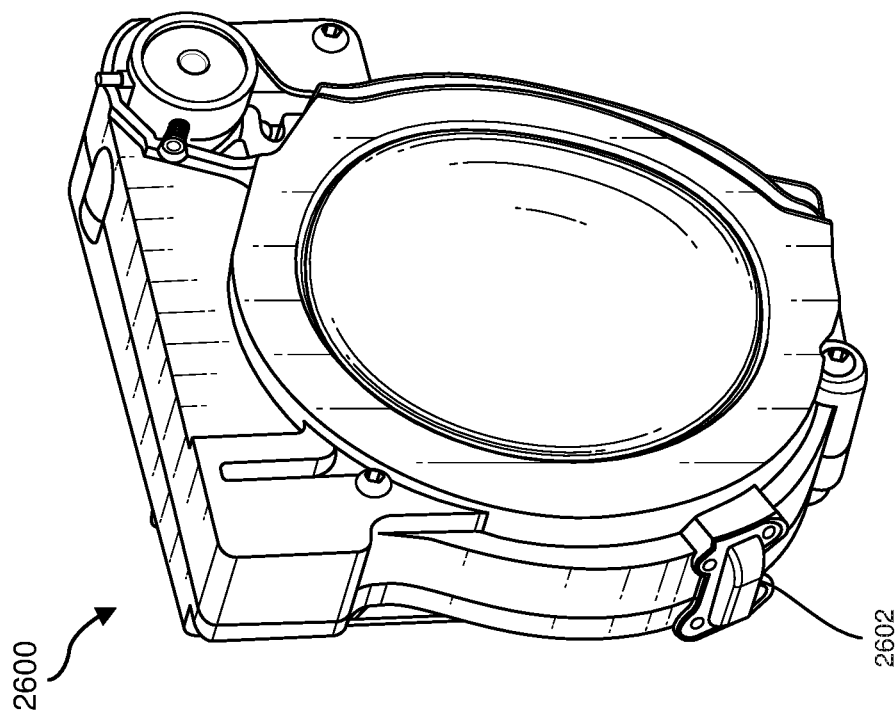
FIG. 26A is a perspective view of an optical assembly including a shock protection element, according to at least one additional embodiment of the present disclosure.

FIG. 26A is a perspective view of an optical assembly 2600 including a shock protection element 2602, according to at least one additional embodiment of the present disclosure. FIG. 26B is a partial cross-sectional view of the optical assembly 2600 and shock protection element 2602. In this example, the shock protection element 2602 may include a flexible enclosure holding a finite volume of fluid (e.g., gas or liquid), such as a molded rubber enclosure. The optical assembly 2600 may be mounted within a corresponding HMD system with elastomeric mounts (e.g., elastomeric washers, an outer surface of the shock protection element 2602, etc.) to provide some potential relative movement between the optical assembly 2600 and the HMD system. Upon a shock event, the shock protection element 2602 may press against a frame of the HMD system, causing the shock protection element 2602 to deform.

As shown in FIG. 26B, the shock protection element 2602 may include one or more expansible features 2604, such as to absorb and distribute shock energy. Like an automobile airbag, a shock event may result in these expansible features 2604 expanding to provide a cushion for a movable optical lens 2606 of the optical assembly 2600. Although only one shock protection element 2602 is visible in the views of FIGS. 26A and 26B, in some embodiments the optical assembly 2600 may include multiple (e.g., two, three, four, or more) shock protection elements 2602 to protect the optical assembly 2600 in case of shock events applying forces to the optical assembly 2600 from different directions.

Figure 27:
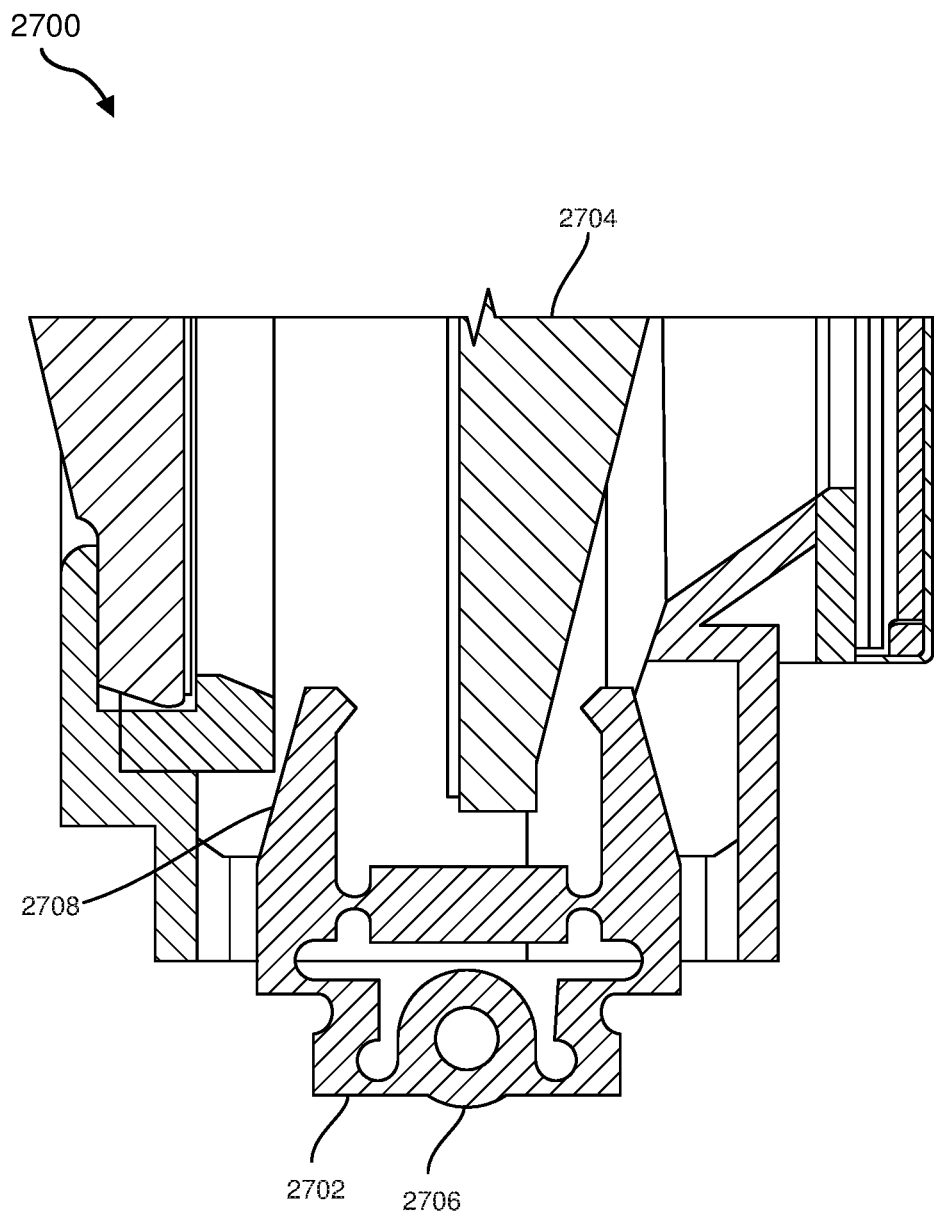
FIG. 27 is a partial cross-sectional view of an optical assembly including a shock protection element, according to at least one further embodiment of the present disclosure.

FIG. 27 is a partial cross-sectional view of an optical assembly 2700 including a shock protection element 2702, according to at least one further embodiment of the present disclosure. The shock protection element 2702 may be positioned and configured to provide a flexible stop against which a movable optical lens 2704 of the optical assembly 2700 may abut during a shock event. For example, the shock protection element 2702 may be a unitary, integral piece of material (e.g., polymer material, elastomer material, metal material, etc.) including a bumper surface 2706 and one or more inner arms 2708 positioned on opposing sides of the movable optical lens 2704. If an inward force is applied to the bumper surface 2706 (e.g., during a shock event), the inner arms 2708 may flex in a direction parallel to the optical axis to limit movement of the movable optical lens 2704.

FIG. 28 is a flow diagram illustrating a method 2800 of varying at least one optical property (e.g., a focal distance) of an optical lens system, according to at least one embodiment of the present disclosure. At operation 2810, a first optical lens may be moved relative to a frame, such as a frame of an HMD. The first optical lens may be positioned between a second optical lens and an electronic display that are stationary relative to the frame. Operation 2810 may be performed in a variety of ways, such as any of the ways discussed above. For example, the first optical lens may be moved with an actuator, such as a VCA, linear actuator, brushless DC motor, stepper motor, piezoelectric actuator, etc.

At operation 2820, the movement of the first optical lens may be guided with a flexure assembly. The flexure assembly may have a first movable end portion coupled to the first optical lens (e.g., via a bracket) and a second fixed end portion coupled to the frame element. Operation 2820 may be performed in a variety of ways, such as any of the ways discussed above.

FIG. 29 is a flow diagram illustrating a method 2900 of fabricating a display subassembly of an HMD, according to at least one embodiment of the present disclosure. At operation 2910, an electronic display and a stationary optical lens may be fixedly coupled to a frame (e.g., a frame of an HMD). At operation 2920, a movable optical lens may be positioned between the electronic display and the stationary optical lens. At operation 2930, a first movable end portion of a flexure assembly may be coupled to the movable optical lens, and a second fixed end portion of the flexure assembly may be coupled to the frame. Operations 2910, 2920, and 2930 may be performed in a variety of ways, such as any of the ways discussed above. The flexure assembly may be configured to guide movement of the movable optical lens in a desired direction, such as substantially along an optical axis of the movable optical lens.

FIG. 30 is a flow diagram illustrating a method 3000 of making varifocal adjustments, according to at least one embodiment of the present disclosure. At operation 3010, a first lens may be moved relative to a frame (e.g., a frame of an HMD system) supporting the first lens and relative to a second lens fixedly coupled to the frame. The lens may be moved from a first position to a second position. Operation 3010 may be performed in a variety of ways, such as any of the ways discussed above. For example, the first lens may be moved by actuating a voice coil actuator that is coupled between the first lens (e.g., via a mounting bracket) and the frame. The movement of the first lens may be guided by a flexure assembly, as described above.

At operation 3020, the first lens may be maintained in the second position by applying, with a brake mechanism, a braking pressure against a mounting bracket coupled to the first lens. Operation 3020 may be performed in a variety of ways, such as any of the ways discussed above. In some examples, a clamp may apply the braking pressure to a protrusion of the mounting bracket. For example, the clamp may be released by constriction of an SMA wire, and a spring element (e.g., a torsional spring) may apply the braking pressure after the SMA wire is lengthened.

Accordingly, the present disclosure includes systems, methods, and devices for making varifocal adjustments in a controlled and predictable manner. In some embodiments, flexure assemblies and/or ball-bearing assemblies may guide movement of a movable optical lens in a desired direction, such as substantially along an optical axis of the movable optical lens. Various example configurations of flexure assemblies and ball-bearing assemblies are described in the present disclosure. In addition, the present disclosure includes lens movement stop mechanisms, such as for use with actuators that have a freely moving output shaft when powered down (e.g., VCAs). The disclosed systems, methods, and devices provide improved configurations compared to conventional varifocal systems, such as by enabling compact and lightweight designs that may be suitable for use in HMD systems.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a 3D effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 3100 in FIG. 31) or that visually immerses a user in an artificial reality (such as, e.g., virtual-reality system 3200 in FIG. 32). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 31, the augmented-reality system 3100 may include an eyewear device 3102 with a frame 3110 configured to hold a left display device 3115(A) and a right display device 3115(B) in front of a user's eyes. The display devices 3115(A) and 3115(B) may act together or independently to present an image or series of images to a user. While the augmented-reality system 3100 includes two displays, embodiments of this disclosure may be implemented in augmented-reality systems with a single NED or more than two NEDs.

In some embodiments, the augmented-reality system 3100 may include one or more sensors, such as sensor 3140. The sensor 3140 may generate measurement signals in response to motion of the augmented-reality system 3100 and may be located on substantially any portion of the frame 3110. The sensor 3140 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 3100 may or may not include the sensor 3140 or may include more than one sensor. In embodiments in which the sensor 3140 includes an IMU, the IMU may generate calibration data based on measurement signals from the sensor 3140. Examples of the sensor 3140 may include, without limitation, accelerometers, gyroscopes, magnetometers, other suitable types of sensors that detect motion, sensors used for error correction of the IMU, or some combination thereof.

In some examples, the augmented-reality system 3100 may also include a microphone array with a plurality of acoustic transducers 3120(A)-3120(J), referred to collectively as acoustic transducers 3120. The acoustic transducers 3120 may represent transducers that detect air pressure variations induced by sound waves. Each acoustic transducer 3120 may be configured to detect sound and convert the detected sound into an electronic format (e.g., an analog or digital format). The microphone array in FIG. 32 may include, for example, ten acoustic transducers: acoustic transducers 3120(A) and 3120(B), which may be designed to be placed inside a corresponding ear of the user, acoustic transducers 3120(C), 3120(D), 3120(E), 3120(F), 3120(G), and 3120(H), which may be positioned at various locations on frame 3110, and/or acoustic transducers 3120(I) and 3120(J), which may be positioned on a corresponding neckband 3105.

In some embodiments, one or more of the acoustic transducers 3120(A)-(F) may be used as output transducers (e.g., speakers). For example, the acoustic transducers 3120(A) and/or 3120(B) may be earbuds or any other suitable type of headphone or speaker.

The configuration of the acoustic transducers 3120 of the microphone array may vary. While the augmented-reality system 3100 is shown in FIG. 31 as having ten acoustic transducers 3120, the number of acoustic transducers 3120 may be greater or less than ten. In some embodiments, using higher numbers of acoustic transducers 3120 may increase the amount of audio information collected and/or the sensitivity and accuracy of the audio information. In contrast, using a lower number of acoustic transducers 3120 may decrease the computing power required by an associated controller 3150 to process the collected audio information. In addition, the position of each acoustic transducer 3120 of the microphone array may vary. For example, the position of an acoustic transducer 3120 may include a defined position on the user, a defined coordinate on frame 3110, an orientation associated with each acoustic transducer 3120, or some combination thereof.

The acoustic transducers 3120(A) and 3120(B) may be positioned on different parts of the user's ear, such as behind the pinna, behind the tragus, and/or within the auricle or fossa. Or, there may be additional acoustic transducers 3120 on or surrounding the ear in addition to acoustic transducers 3120 inside the ear canal. Having an acoustic transducer 3120 positioned next to an ear canal of a user may enable the microphone array to collect information on how sounds arrive at the ear canal. By positioning at least two of the acoustic transducers 3120 on either side of a user's head (e.g., as binaural microphones), the augmented-reality device 3100 may simulate binaural hearing and capture a 3D stereo sound field around about a user's head. In some embodiments, the acoustic transducers 3120(A) and 3120 (B) may be connected to the augmented-reality system 3100 via a wired connection 3130, and in other embodiments the acoustic transducers 3120(A) and 3120(B) may be connected to augmented-reality system 3100 via a wireless connection (e.g., a Bluetooth connection). In still other embodiments, the acoustic transducers 3120(A) and 3120 (B) may not be used at all in conjunction with the augmented-reality system 3100.

The acoustic transducers 3120 on the frame 3110 may be positioned in a variety of different ways, including along the length of the temples, across the bridge, above or below the display devices 3115(A) and 3115(B), or some combination thereof. The acoustic transducers 3120 may also be oriented such that the microphone array is able to detect sounds in a wide range of directions surrounding the user wearing the augmented-reality system 3100. In some embodiments, an optimization process may be performed during manufacturing of the augmented-reality system 3100 to determine relative positioning of each acoustic transducer 3120 in the microphone array.

In some examples, the augmented-reality system 3100 may include or be connected to an external device (e.g., a paired device), such as the neckband 3105. The neckband 3105 generally represents any type or form of paired device. Thus, the following discussion of the neckband 3105 may also apply to various other paired devices, such as charging cases, smart watches, smart phones, wrist bands, other wearable devices, hand-held controllers, tablet computers, laptop computers, other external compute devices, etc.

As shown, the neckband 3105 may be coupled to the eyewear device 3102 via one or more connectors. The connectors may be wired or wireless and may include electrical and/or non-electrical (e.g., structural) components. In some cases, the eyewear device 3102 and the neckband 3105 may operate independently without any wired or wireless connection between them. While FIG. 31 illustrates the components of the eyewear device 3102 and the neckband 3105 in example locations on the eyewear device 3102 and the neckband 3105, the components may be located elsewhere and/or distributed differently on the eyewear device 3102 and/or the neckband 3105. In some embodiments, the components of the eyewear device 3102 and the neckband 3105 may be located on one or more additional peripheral devices paired with the eyewear device 3102, the neckband 3105, or some combination thereof.

Pairing external devices, such as the neckband 3105, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 3100 may be provided by a paired device or shared between a paired device and an eyewear device, thus reducing the weight, heat profile, and form factor of the eyewear device overall while still retaining desired functionality. For example, the neckband 3105 may allow components that would otherwise be included on an eyewear device to be included in the neckband 3105 since users may tolerate a heavier weight load on their shoulders than they would tolerate on their heads. The neckband 3105 may also have a larger surface area over which to diffuse and disperse heat to the ambient environment. Thus, the neckband 3105 may allow for greater battery and computation capacity than might otherwise have been possible on a stand-alone eyewear device. Since weight carried in the neckband 3105 may be less invasive to a user than weight carried in the eyewear device 3102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 3105 may be communicatively coupled with the eyewear device 3102 and/or to other devices. These other devices may provide certain functions (e.g., tracking, localizing, depth mapping, processing, storage, etc.) to the augmented-reality system 3100. In the embodiment of FIG. 31, the neckband 3105 may include two acoustic transducers (e.g., 3120(1) and 3120(J)) that are part of the microphone array (or potentially form their own microphone subarray). The neckband 3105 may also include a controller 3125 and a power source 3135.

The acoustic transducers 3120(1) and 3120(J) of the neckband 3105 may be configured to detect sound and convert the detected sound into an electronic format (analog or digital). In the embodiment of FIG. 31, the acoustic transducers 3120(1) and 3120(J) may be positioned on the neckband 3105, thereby increasing the distance between the neckband acoustic transducers 3120(1) and 3120(J) and other acoustic transducers 3120 positioned on the eyewear device 3102. In some cases, increasing the distance between the acoustic transducers 3120 of the microphone array may improve the accuracy of beamforming performed via the microphone array. For example, if a sound is detected by the acoustic transducers 3120(C) and 3120(D) and the distance between the acoustic transducers 3120(C) and 3120(D) is greater than, e.g., the distance between the acoustic transducers 3120(D) and 3120(E), the determined source location of the detected sound may be more accurate than if the sound had been detected by the acoustic transducers 3120(D) and 3120(E).

The controller 3125 of the neckband 3105 may process information generated by the sensors on the neckband 3105 and/or the augmented-reality system 3100. For example, the controller 3125 may process information from the microphone array that describes sounds detected by the microphone array. For each detected sound, the controller 3125 may perform a direction-of-arrival (DOA) estimation to estimate a direction from which the detected sound arrived at the microphone array. As the microphone array detects sounds, the controller 3125 may populate an audio data set with the information. In embodiments in which augmented-reality system 3100 includes an inertial measurement unit, the controller 3125 may compute all inertial and spatial calculations from the IMU located on the eyewear device 3102. A connector may convey information between the augmented-reality system 3100 and the neckband 3105 and between the augmented-reality system 3100 and the controller 3125. The information may be in the form of optical data, electrical data, wireless data, or any other transmittable data form. Moving the processing of information generated by the augmented-reality system 3100 to the neckband 3105 may reduce weight and heat in the eyewear device 3102, making it more comfortable to the user.

A power source 3135 in the neckband 3105 may provide power to the eyewear device 3102 and/or to the neckband 3105. The power source 3135 may include, without limitation, lithium ion batteries, lithium-polymer batteries, primary lithium batteries, alkaline batteries, or any other form of power storage. In some cases, the power source 3135 may be a wired power source. Including the power source 3135 on the neckband 3105 instead of on the eyewear device 3102 may help better distribute the weight and heat generated by the power source 3135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 3200 in FIG. 32, that mostly or completely covers a user's field of view. The virtual-reality system 3200 may include a front rigid body 3202 and a band 3204 shaped to fit around a user's head. The virtual-reality system 3200 may also include output audio transducers 3206(A) and 3206(B). Furthermore, while not shown in FIG. 32, the front rigid body 3202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in the augmented-reality system 3100 and/or the virtual-reality system 3200 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in the augmented-reality system 3100 and/or the virtual-reality system 3200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 3100 and/or the virtual-reality system 3200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

By way of example and not limitation, the following embodiments are included in the present disclosure:

Example 1: A system for varifocal adjustments, which may include: a frame; an optical lens pair supported by the frame, including: a first lens that is movably coupled to the frame, the first lens having a first optical axis and being movable relative to the frame along the first optical axis; and a second lens that is fixedly coupled to the frame, the second lens having a second optical axis; and a flexure assembly configured to constrain movement of the first lens to a substantially linear pathway, wherein the flexure assembly includes at least one substantially planar flexure element having a first movable end portion coupled to the first lens and a second fixed end portion coupled to the frame.

Example 2: The system of Example 1, wherein the flexure assembly includes a first flexure element and a second flexure element that are separated from each other by a gap.

Example 3: The system of Example 2, wherein the gap is maintained by a first end block coupling a first end portion of the first flexure element to a first end portion of the second flexure element and by a second end block coupling a second end portion of the first flexure element to a second end portion of the second flexure element.

Example 4: The system of Example 2 or Example 3, wherein the flexure assembly further includes: a third flexure element positioned adjacent to the first flexure element, the first flexure element and third flexure element forming a first flexure pair; and a fourth flexure element positioned adjacent to the second flexure element, the second flexure element and fourth flexure element forming a second flexure pair.

Example 5: The system of any of Examples 1 through 4, wherein the at least one substantially planar flexure element includes a central portion having a greater thickness than end portions thereof.

Example 6: The system of Example 5, wherein the at least one substantially planar flexure element includes a base member and the central portion of the substantially planar flexure element includes a stiffener material coupled to the base member.

Example 7: The system of Example 6, wherein the stiffener material includes at least one of a polymer material or a metal material.

Example 8: The system of Example 6 or Example 7, wherein the base member has a thickness of about 0.003 inch or less.

Example 9: The system of any of Examples 6 through 8, wherein the stiffener material is coupled to only one side of the base member.

Example 10: The system of any of Examples 6 through 9, wherein the base member includes a metal material.

Example 11: The system of any of Examples 1 through 10, wherein the at least one flexure element has a shape defining a cutout to avoid optically obstructing light passing through the first lens parallel to the first optical axis.

Example 12: The system of any of Examples 1 through 11, further including an electronic display configured to display visual content to an intended user of the system for varifocal adjustments.

Example 13: The system of Example 12, wherein the first lens is positioned between the electronic display and the second lens.

Example 14: A head-mounted display system, which may include: an electronic display mounted to a frame; a first lens that is movably coupled to the frame, the first lens being movable relative to the frame; a second lens that is fixedly coupled to the frame, wherein the electronic display, first lens, and second lens are positioned for an intended user donning the head-mounted display system to view the electronic display through the first lens and the second lens;

and a flexure assembly including at least one substantially planar flexure element having a first movable end portion coupled to the first lens and a second fixed end portion coupled to the frame.

Example 15: The system of Example 14, wherein the first lens is positioned between the electronic display and the second lens.

Example 16: The system of Example 14 or Example 15, wherein the at least one substantially planar flexure element of the flexure assembly includes a first flexure element set of multiple flexure elements and a second flexure element set of multiple flexure elements, wherein the first flexure element set and the second flexure element set are separated from each other by a gap.

Example 17: The system of any of Examples 14 through 16, wherein the at least one substantially planar flexure element of the flexure assembly includes a first flexure element positioned adjacent to a first lateral side of the first lens and a second flexure element positioned adjacent to a second, different lateral side of the first lens.

Example 18: The system of any of Examples 14 through 17, wherein the frame is a frame of a virtual-reality head-mounted display system.

Example 19: A method of forming a system for varifocal adjustments, which may include: fixedly coupling an electronic display and a stationary optical lens to a frame; positioning a movable optical lens between the electronic display and the stationary optical lens; and coupling a first movable end portion of a flexure assembly to the movable optical lens and coupling a second fixed end portion of the flexure assembly to the frame.

Example 20: The method of Example 19, wherein coupling the first movable end portion of the flexure assembly to the movable optical lens includes coupling a first end block of the flexure assembly to the movable optical lens and wherein coupling the second fixed end portion of the flexure assembly to the frame includes coupling a second end block of the flexure assembly to the frame.

Example 21: A system for varifocal adjustments, which may include: a frame; an optical lens pair supported by the frame, including: a first lens that is movably coupled to the frame, the first lens having a first optical axis and being movable relative to the frame along the first optical axis; and a second lens that is fixedly coupled to the frame, the second lens having a second optical axis; and a brake mechanism coupled to the frame and configured to frictionally stop movement of and maintain a position of the first lens along the first optical axis.

Example 22: The system of Example 21, wherein the brake mechanism includes at least one clamp arm positioned to apply a braking pressure against a mounting bracket of the first lens.

Example 23: The system of Example 22, wherein: the at least one clamp arm includes a first clamp arm and a second clamp arm; the mounting bracket includes a fin extending away from the mounting bracket; and the first clamp arm and the second clamp arm are positioned to apply a compressive force against the fin.

Example 24: The system of Example 22 or Example 23, wherein the brake mechanism further includes a brake actuator for moving the at least one clamp arm.

Example 25: The system of Example 24, wherein the brake actuator includes a wire coupled to the at least one clamp arm, wherein the wire is configured to apply a force to the at least one clamp arm to rotate the at least one clamp arm.

Example 26: The system of Example 25, wherein the wire includes a shape memory alloy and the wire has a length that is alterable upon application of a sufficient electrical voltage to the wire.

Example 27: The system of Example 25 or Example 26, wherein: the at least one clamp arm includes a first clamp arm and a second clamp arm; and the wire is coupled to a portion of each of the first clamp arm and the second clamp arm.

Example 28: The system of any of Examples 22 through 27, further including at least one spring positioned to bias the at least one clamp arm to a braking position.

Example 29: The system of any of Examples 22 through 28, further including at least one brake insert coupled to the at least one clamp arm in a position to apply the braking pressure against the mounting bracket.

Example 30: The system of Example 29, wherein the brake insert includes a polymeric material.

Example 31: The system of any of Examples 21 through 30, further including a voice coil actuator mounted to the frame and configured to move the first lens along the first optical axis.

Example 32: The system of any of Examples 21 through 31, further including a flexure assembly configured to guide movement of the first lens along the first optical axis.

Example 33: The system of any of Examples 21 through 32, wherein the brake mechanism includes a first clamp arm and a second clamp arm having a common axis of rotation that is substantially aligned with the first optical axis.

Example 34: A head-mounted display system, which may include: an electronic display element mounted to a frame; a first lens that is mounted on a mounting bracket and that is movably coupled to the frame, the first lens being movable relative to the frame; a second lens that is fixedly coupled to the frame, wherein the electronic display, first lens, and second lens are positioned for an intended user donning the head-mounted display system to view the electronic display through the first lens and the second lens; and a brake mechanism coupled to the frame and positioned to apply a braking pressure against the mounting bracket.

Example 35: The system of Example 34, further including a lens movement actuator including a base coupled to the frame and an output shaft coupled to the mounting bracket.

Example 36: The system of Example 35, wherein the brake mechanism includes a first clamp arm and a second clamp arm each rotatably coupled to the frame and configured to engage a respective surface of the mounting bracket to apply a braking pressure against the mounting bracket.

Example 37: The system of Example 36, wherein the brake mechanism includes a brake actuator configured such that actuation of the brake actuator results in releasing a brake pressure applied by the first clamp arm and the second clamp arm against the mounting bracket.

Example 38: The system of any of Examples 34 through 37, wherein the frame is a frame of a virtual-reality head-mounted display system.

Example 39: A method of making varifocal adjustments, which may include: moving a first lens relative to a frame supporting the first lens and relative to a second lens fixedly coupled to the frame, wherein the first lens is moved from a first position to a second position; and maintaining the first lens in the second position by applying, with a brake mechanism, a braking pressure against a mounting bracket coupled to the first lens.

Example 40: The method of Example 39, wherein moving the first lens relative to the frame and relative to the second lens includes actuating a voice coil actuator.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system for varifocal adjustments, comprising:
   a frame;
   an optical lens pair supported by the frame, comprising:
      a first lens that is movably coupled to the frame, the first lens having a first optical axis and being movable relative to the frame along the first optical axis; and
      a second lens that is fixedly coupled to the frame, the second lens having a second optical axis;
   a flexure assembly with a first end portion coupled to the first lens by a bracket and a second end portion coupled to the frame;
   a brake mechanism coupled to the frame and comprising clamps configured to clamp onto a fin protruding from the bracket to frictionally stop movement of and maintain a position of the first lens along the first optical axis; and
   an actuator for moving the first lens that is movably coupled to the frame.

2. The system of claim 1, wherein the clamps of the brake mechanism comprise clamp arms positioned to apply a compressive force against the fin protruding from the bracket.

3. The system of claim 2, wherein:
   the actuator for moving the first lens that is movably coupled to the frame is configured such that the actuator does not inherently stop movement of the first lens when the actuator is powered down.

4. The system of claim 2, wherein the brake mechanism further comprises a brake actuator for moving the clamp arms.

5. The system of claim 4, wherein the brake actuator comprises a wire coupled to the clamp arms, wherein the wire is configured to apply a force to the clamp arms to rotate the clamp arms.

6. The system of claim 5, wherein the wire comprises a shape memory alloy and the wire has a length that is alterable upon application of a sufficient electrical voltage to the wire.

7. The system of claim 5, wherein:
   the clamp arms comprise a first clamp arm and a second clamp arm; and
   the wire is coupled to a portion of each of the first clamp arm and the second clamp arm.

8. The system of claim 2, further comprising at least one spring positioned to bias the clamp arms to a braking position.

9. The system of claim 2, further comprising brake inserts coupled to the clamp arms in a position to apply the compressive force against the bracket.

10. The system of claim 9, wherein the brake inserts comprise a polymeric material.

11. The system of claim 1, wherein the actuator comprises a voice coil actuator mounted to the frame and configured to move the first lens along the first optical axis.

12. The system of claim 2, wherein the compressive force applied by the clamps against the fin frictionally stops movement and maintains the position of the first lens along the first optical axis upon removal of electrical current form the actuator.

13. The system of claim 1, wherein the clamps comprise a first clamp arm and a second clamp arm having a common axis of rotation that is substantially parallel to the first optical axis.

14. A head-mounted display system, comprising:
   an electronic display element mounted to a frame;
   a first lens that is mounted on a mounting bracket and that is movably coupled to the frame, the first lens being movable relative to the frame along a first optical axis;
   a flexure assembly with a first end portion coupled to the first lens via the mounting bracket and a second end portion coupled to the frame;
   a second lens that is fixedly coupled to the frame, wherein the electronic display element, the first lens, and the second lens are positioned for an intended user donning the head-mounted display system to view the electronic display element through the first lens and the second lens;
   a brake mechanism coupled to the frame and comprising clamps positioned to apply a braking pressure against a fin protruding from the mounting bracket; and
   an actuator for moving the first lens that is movably coupled to the frame.

15. The head-mounted display system of claim 14, further comprising a lens movement actuator including a base coupled to the frame and an output shaft coupled to the mounting bracket.

16. The head-mounted display system of claim 15, wherein the clamps of the brake mechanism comprise a first clamp arm and a second clamp arm each rotatably coupled to the frame and configured to engage surfaces of the fin protruding from the mounting bracket to apply a clamping force against the fin protruding from the mounting bracket.

17. The head-mounted display system of claim 16, wherein the brake mechanism comprises a brake actuator configured such that actuation of the brake actuator results in releasing a clamping force applied by the first clamp arm and the second clamp arm against the fin protruding from the mounting bracket.

18. The head-mounted display system of claim 14, wherein the frame is a frame of a virtual-reality head-mounted display system.

19. A method of making varifocal adjustments, the method comprising:
- moving a first lens relative to a frame supporting the first lens and relative to a second lens fixedly coupled to the frame, wherein the first lens is moved from a first position to a second position along a first optical axis; and wherein:
- moving the first lens relative to the frame supporting the first lens is performed by an actuator and guided by a flexure assembly with a first end portion coupled to the first lens by a bracket and second end portion coupled to the frame; and
- maintaining the first lens in the second position by applying, with a brake mechanism comprising clamps, a clamping force onto a fin protruding from the bracket.

20. The method of claim 19, wherein moving the first lens relative to the frame and relative to the second lens comprises actuating a voice coil actuator.

* * * * *